(12) United States Patent
Greive et al.

(10) Patent No.: US 8,595,688 B1
(45) Date of Patent: Nov. 26, 2013

(54) GENERATION OF INSTRUCTION SET FROM ARCHITECTURE DESCRIPTION

(75) Inventors: Volker Greive, Aachen (DE); Achim Nohl, Aachen (DE)

(73) Assignee: Synopsys, Inc., Mountain View, CA (US)

(*) Notice: Subject to any disclaimer, the term of this patent is extended or adjusted under 35 U.S.C. 154(b) by 1821 days.

(21) Appl. No.: 10/936,230

(22) Filed: Sep. 7, 2004

Related U.S. Application Data

(60) Provisional application No. 60/501,475, filed on Sep. 8, 2003.

(51) Int. Cl.
*G06F 9/44* (2006.01)

(52) U.S. Cl.
USPC .......................................... 717/106

(58) Field of Classification Search
None
See application file for complete search history.

(56) References Cited

U.S. PATENT DOCUMENTS

| | | | | |
|---|---|---|---|---|
| 4,161,026 A | * | 7/1979 | Wilhite | 712/232 |
| 5,511,173 A | * | 4/1996 | Yamaura et al. | 712/248 |
| 5,854,929 A | * | 12/1998 | Van Praet et al. | 717/156 |
| 5,918,035 A | * | 6/1999 | Van Praet et al. | 703/22 |
| 6,286,134 B1 | * | 9/2001 | Click et al. | 717/138 |
| 6,457,173 B1 | * | 9/2002 | Gupta et al. | 717/149 |
| 7,107,568 B2 | * | 9/2006 | Cronquist | 716/103 |
| 7,111,278 B1 | * | 9/2006 | Siska, Jr. | 717/106 |

OTHER PUBLICATIONS

Javanotes 6.0, Section 9.4 "Binary Trees", Jan. 31, 2001, 11 pages [online] [retrieved on Aug. 14, 2012]. Retrieved from <http://math.hws.edu/javanotes/c9/s4.html#recursion.4.1>.*
Greive, V., "Investigations in the Automatic Design of Instruction-Sets for Programmable Architectures," Diploma Thesis D 435, Aachen University of Technology, Sep. 2002, 79 pages.
Greive, V., "Investigations in the Automatic Design of Instruction-Sets for Programmable Architectures," Institute for Integrated Signal Processing Systems, LISA, Sep. 2002, 17 pages.
Hoffman, A. et al., "Architecture Exploration for Embedded Processors with LISA," Kluwer Academic Publishers, 2002, 112 pages.
Glokler, et al., Power Efficient Semi-Automatic Instruction Encoding for Application Specific Instruction Set Processors, 2001, IEEE International Conference on Acoustics, Speech and Signal Processing, pp. 1169-1172 vol. 2.
Huang, et al., Synthesis of Instruction Sets for Pipelined Microprocessors, 1994, 31$^{st}$ ACM/IEEE Design Automation Conference pp. 5-11.

(Continued)

*Primary Examiner* — Li B Zhen
*Assistant Examiner* — Evral Bodden
(74) *Attorney, Agent, or Firm* — Fenwick & West LLP

(57) ABSTRACT

Generating an instruction set for an architecture. A hierarchical description of an architecture is accessed. Groups in the hierarchical description that can be pre-encoded without increasing final width of said instruction set are pre-encoded. The hierarchical description is permutated into a plurality of variations. Each variation comprises a leaf-group and one or more sub-graphs to be encoded. For each said variation, the leaf-group and the one or more sub-graphs are encoded to produce a potential instruction set for each variation. One of the potential instruction sets is selected.

43 Claims, 28 Drawing Sheets

(56) References Cited

OTHER PUBLICATIONS

Lefurgy, et al., Improving Code Density Using Compression Techniques, 1997, Thirtieth Annual IEEE/ACM International Symposium on Microarchitecture pp. 194-203.

Kim, et al., Opcode Encoding for Low-Power Instruction Fetch, Jun. 24, 1999, IEEE Electronics Letter, vol. 35 Issue: 13 pp. 1064-1065.

Fauth, et al., Describing Instruction Set Processors Using NML, 1995, European Design and Test Conf. Paris.

Okuma, et al., Instruction Encoding Techniques for Area Minimization of Instruction ROM, 1998, 11$^{th}$ International Symposium on System Synthesis.

Aditya, et al., Code Size Minimization and Retargetable Assembly for Custom Epic and VLIW Instruction Formats, Oct. 2000, ACM Transactions on Design Automation of Electronic Systems vol. 5, No. 4;pp. 752-773.

\* cited by examiner

1200

```
START
  ↓
ACCESS HIERARCHICAL DESCRIPTION OF A COMPUTER
ARCHITECTURE
1210
  ↓
DETERMINE A LEAF GROUP TO BE ENCODED
1220
  ↓
RESOLVE AMBIGUITIES, IF ANY IN HIERARCHICAL DESCRIPTION,
DUE TO PATH-SPLITS (INCLUDING ENCODING PATH-GROUPS)
1230
  ↓
RESOLVE MULTI-OCCURANCE OPERATIONS IN HIERARCHICAL
DESCRIPTION
1240
  ↓
RESOLVE OPERATIONS COMPRISING MORE THAN ONE GROUP
(INCLUDING PERMUTING THE HIERARCHICAL DESCRIPTION INTO
VARIATIONS)
1245
  ↓
PROPAGATE PAYLOAD AND ENCODING WIDTHS TO THE LEAF GROUP
1250
  ↓
ENCODE LEAF GROUP USING PROPAGATED PAYLOAD AND ENCODING
WIDTHS
1260
  ↓
END
```

```
START
  ↓
ACCESS HIERARCHICAL DESCRIPTION OF A COMPUTER
ARCHITECTURE
1510
  ↓
DETERMINE A LEAF GROUP TO BE ENCODED
1515
  ↓
IDENTIFY OPERATIONS ABOVE PATH SPLIT-UP
1520
  ↓
COMBINE OPERATIONS ABOVE PATH SPLIT-UP
1530
  ↓
ENCODE PATH-ID GROUPS
1540
  ↓
ENCODE SUBTREES THAT HAVE NOT BEEN ENCODED ALREADY
1550
  ↓
PROPAGATE PAYLOAD AND ENCODING WIDTHS TO THE LEAF GROUP
1560
  ↓
ENCODE LEAF GROUP USING PROPAGATED PAYLOAD AND ENCODING
WIDTHS
1570
  ↓
END
```

FIGURE 15

GENERATION OF INSTRUCTION SET FROM ARCHITECTURE DESCRIPTION

RELATED APPLICATION

This Application claims priority to U.S. Provisional Application entitled, "Methodology for Automatic Encoding Synthesis Using Hierarchical Processor Models," Application No. 60/501,475, filed on Sep. 8, 2003, which application is hereby incorporated by reference.

FIELD OF THE INVENTION

Embodiments of the present invention relate to the field of software tools for system level design. Specifically, embodiments of the present invention relate to automatically generating an instruction set from an architecture description.

BACKGROUND ART

As demand for high-performance, low-power embedded architectures increases, development is generally turning away from flexible but inefficient GPAs (general purpose architectures) and highly efficient but inflexible ASICs (application specific integrated circuits), towards a symbiosis of those two worlds efficiently embodied in ASIPs (application specific instruction set processors). The flexibility of ASIPs allows late design changes—even after product roll-out. However, compared to ASICs and GPAs, ASIPs provide a tradeoff of computational performance and flexibility on the one hand and power consumption on the other.

Moreover, designing ASIPs can be far more complex than assembling systems with standard processors. Typically, designing ASIPs comprises an iterative exploration in which hardware and software are explored and modified. Integrated development tool suites deliver the flexibility needed to design a processor tailored to the needs of the intended application. However, the design effort is still significant when designing all aspects of the architecture in detail. For example, with conventional tools considerable effort goes into the definition of an instruction set, which plays an important role as it conveys the data and control flow of a given application.

Moreover, the instruction set should be designed to use memory and power efficiently. An instruction set with a small instruction word width is desirable in that chip memory and power are dependent on the width of the instruction set. Thus, an important factor for designing a power-efficient instruction set is the overall instruction word width. Several approaches have been attempted towards compact instruction encoding. However, each conventional technique has limitations. Some conventional approaches attempt to minimize the widest instruction word width. Other conventional approaches are based on minimizing the average instruction width by using statistical means profiled from a specific application program that is to be run on the architecture being designed. Other conventional techniques seek to conserve power by profiling the specific application program to minimize the toggling of bits in consecutive instruction words and encoding those words similarly.

Immediate Encoding

One conventional method to produce an efficient instruction set is to encode immediate values in instruction words, so that the bit-fields in the instruction words used for immediate values can be down-sized. This is illustrated in the diagram 140 in FIG. 1 showing a pre-decoding stage 153 and a main decoder 155. The fields 152 of the instruction 151 do not refer to the immediate value itself in this technique, but to an address in a lookup-table 154 that contains the actual value 156. For example, instead of using 16-bits in a 32-bit instruction word for conveying an immediate value, an 8-bit address in a lookup-table comprising at most 256 different immediates would be used, thereby reducing the width of the instruction to 24 bits.

While potentially reducing the overall instruction width, this approach has several major disadvantages. Overhead is added to the decoding process because an additional immediate decoding stage has to be added. Further, the size of the lookup-table 154 may have to be increased, thereby leading to a larger die-size. If the table-size is not increased, the flexibility of the architecture is reduced because the number of different immediate values that an application may use is limited to the number available in the lookup-table 154. Therefore, using this approach, it is mandatory to consider the application designed to run on the architecture. Further, for this method to be beneficial, the increase in die-size that is evoked by the implementation of the lookup-table 154 has to be compensated by the reduction in program memory. There might also be a slight decrease in system performance due to the table-walk necessary for immediate decoding. These trade-offs have to be measured wisely to gain an overall advantage from this method. Such assessment of the trade-offs is a difficult process and may result in an inaccurate assessment.

Improving Code Density Using Compression Techniques

A conventional approach that uses dictionary-based compression techniques similar to file compression programs for improving code density is illustrated in FIG. 2. In this example, certain opcodes (referred to as illegal opcodes) of the original program 165 are mapped to frequently used instruction-sequences 166 (opcodes and specific operands of several instructions). These mappings are stored in a dictionary 168 and the sequences in program code are replaced by the "virtual instructions" 169. Whenever such a virtual instruction 169 is hit in the compressed program 170, it is looked up in the dictionary 168 and replaced by the original sequence 166.

Thereby, a set of instructions (e.g., instructions sequences 166) may be replaced by a single one (e.g., virtual instruction 169), efficiently compressing the program. The disadvantage of this technique is that it adds overhead to the decoding process as the illegal instruction has to be intercepted and to be replaced by the original program code. This will reduce performance of the program significantly. Therefore, this approach is only feasible in an environment where the systems' bottleneck is memory, not speed. Furthermore, compression results depend heavily on the specific program structure. If there are not many identical instruction sequences in the code, no relevant compression will be achieved. This is especially true as the dictionary has to be stored as part of the program. Hence, the actual application has to be considered before this method can be applied successfully.

Minimizing Average Instruction Width Using Huffman-Encoding

In information theory, statistical methods are used to compress information symbols in a signal. While frequently used symbols get a shorter codeword, rarely occurring symbols have a longer codeword. For example when encoding a text, frequent words like "the" or "and" would get a shorter codeword than the average codeword-length needed, specific names would get a codeword longer than the average length. On average, the total information to be transmitted would be reduced. The compression ratio depends on the prior statistical analysis of the information that is to be transferred. One statistical encoding method is Huffman-encoding.

Huffman-encoding is applied to instruction opcode encoding to minimize the average instruction word width in one conventional technique. However, this technique depends heavily on the knowledge of the actual application that is to be run on the architecture and will deliver optimum results only for this specific application. While not absolutely limiting the flexibility of the architecture (other programs can be run), it may deliver unacceptable results for other application cases.

Optimization of Bit-Toggling Using Statistical Profiling

Another approach to design power-efficient instruction sets is also based on statistical analysis of the application intended to be executed on the architecture. The basic idea is to profile the program for consecutive instructions and to encode them in a similar way, so that the number of bits whose state has to be switched is minimal when loading the next instruction into the decoder. This reduces power dissipation, as it reduces the number of bit lines that have to switched in the decoder, and the static RAM cells used for register memories may consume more power when they are switched from one state to another then when they are idle.

The problem is usually approached with mapping the instruction encodings to a finite state machine with weighted edges, using several methods (for example heuristics) to determine the optimum solution to it. As mentioned, this method also depends on statistical profiling, and therefore to be most efficient is constrained to the application for which it was optimized. In general, while some power efficiency can be achieved using this method, the gain may be orders of magnitudes lower than the one obtained by instruction width optimization. This is because reducing instruction width may reduce the size of the memory, which is one of the most power-hungry parts of the chip. On the other hand, reducing bit-toggling only slightly reduces power consumption within the decoding unit and registers. However, these units are usually only minor contributors to overall power consumption.

SUMMARY OF THE INVENTION

Therefore, it would be advantageous to provide a method and system for designing an instruction set for application specific processors and the like. It would be further advantageous for the method and system to automatically generate an instruction set that has a small instruction set bit width. It would be still further advantageous for the method and system to automatically generate a power efficient instruction set. It would be still further advantageous for the method and system to automatically generate a memory efficient instruction set.

Accordingly, embodiments of the present invention provide methods and systems that automatically generate an instruction set based on a hierarchical description of the architecture for which the instruction set is desired. For example, the hierarchical description may be an architecture description language (ADL) description of an application specific processor or the like. Embodiments of the present invention provide methods and systems to automatically generate an instruction set that has a small instruction set bit width. Embodiments of the present invention provide methods and systems that automatically generate a power efficient instruction set. Embodiments of the present invention provide methods and systems that automatically generate a memory efficient instruction set. Embodiments of the present invention provide these advantages and others not specifically mentioned above but described in the sections to follow.

One embodiment of the present invention applies a local encoding computer implemented algorithm of generating an instruction set for an architecture in accordance with the following steps. A hierarchical description of an architecture comprising plurality of groups as accessed. The groups comprise one or more operations. Payload width parameters are determined for operations in the hierarchical description. Traversing from leaf to root of the hierarchical description each of the groups is encoded individually based on the payload width parameters and encoding width parameters. The encoding of a group generates an encoding width parameter that is propagated to a parent of that group to be used when encoding the parent.

Another embodiment of the present invention applies a global encoding computer implemented algorithm of generating an instruction set for an architecture in accordance with the following steps. A hierarchical description of an architecture is accessed. A group comprising leaf operations in the hierarchical description is determined. Bit width parameters are propagated down the hierarchical description to the group comprising the leaf operations. The bit width parameters can include payload information associated with operations. Operations in the leaf group are encoded based on the bit widths. The hierarchical description is traversed between a root of the hierarchical description and the leaf operations to determine the instruction set. Instructions are defined by unique paths.

Yet another embodiment applies a hybrid encoding computer implemented algorithm of generating an instruction set for an architecture in accordance with the following steps. A hierarchical description of an architecture is accessed. Groups in the hierarchical description that can be pre-encoded without increasing final width of the instruction set are pre-encoded. For example, groups that are perfectly packed are pre-encoded. The hierarchical description is permutated into a plurality of variations. Each variation comprises a leaf-group and one or more sub-graphs to be encoded. For each said variation, the leaf-group and the one or more sub-graphs are encoded to produce a potential instruction set for each variation. One of the potential instruction sets is selected.

Still another embodiment of the present invention comprises a computer-implemented method of generating an instruction set from an architecture description. The method comprises accessing a hierarchical description of an architecture description; identifying bit width parameters for nodes of the hierarchical description; encoding selected nodes of the hierarchical description based on the bit width parameters; and forming an instruction set for the architecture description by traversing from a root to leaf nodes of the hierarchical description, wherein instructions are defined by unique paths of the hierarchical description.

Systems in accordance with embodiments of the present invention are also described herein.

BRIEF DESCRIPTION OF THE DRAWINGS

FIG. 12 is a flowchart illustrating steps of a process of automatically generating an instruction set from a hierarchical description using global encoding, in accordance with an embodiment of the present invention.

FIG. 15 is a flowchart illustrating steps of a process of automatically generating an instruction set from a hierarchical description, in accordance with an embodiment of the present invention.

DETAILED DESCRIPTION OF THE INVENTION

Figure 1:
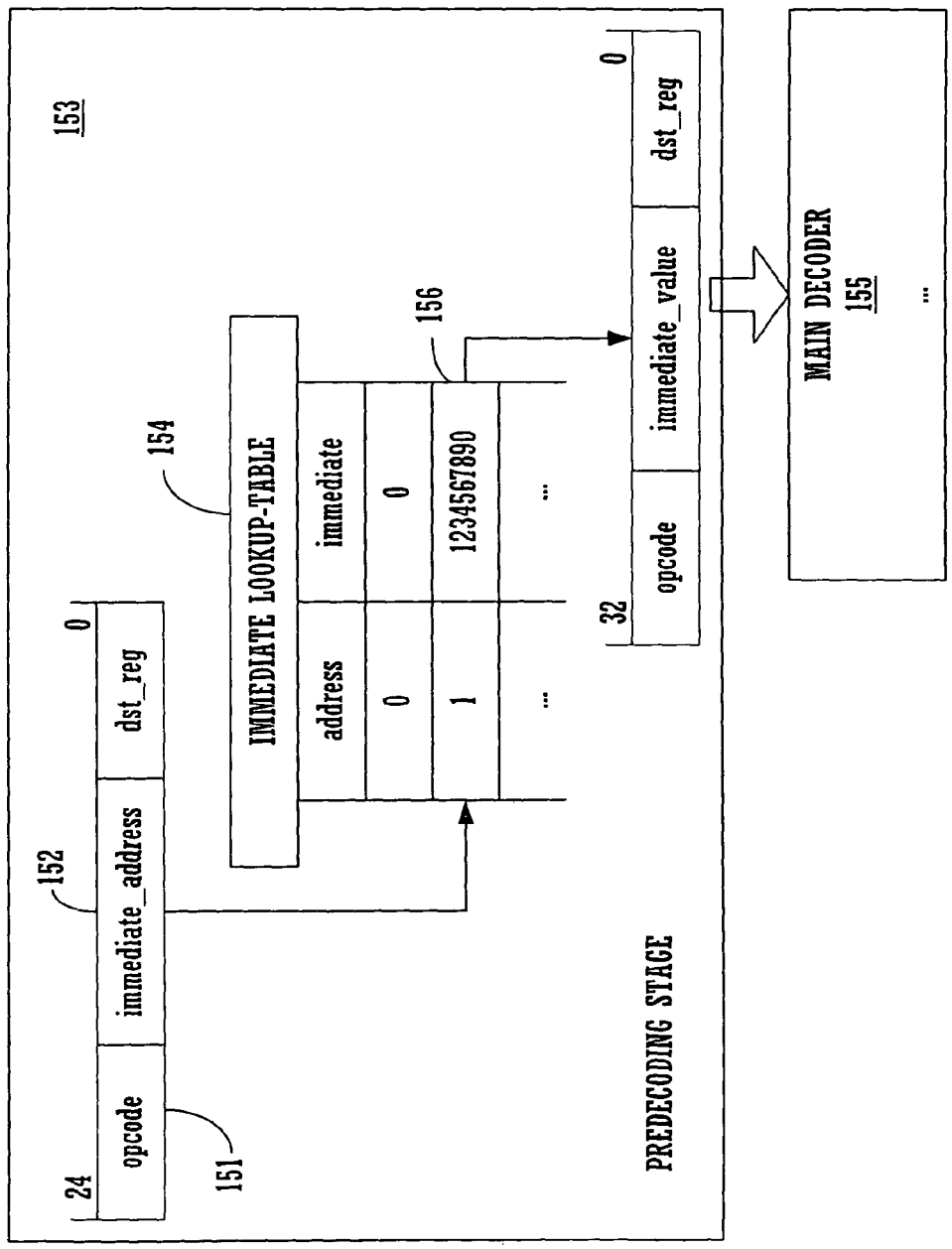
FIG. 1 is a diagram of a conventional method to encode immediate values in instruction words.
Figure 2:
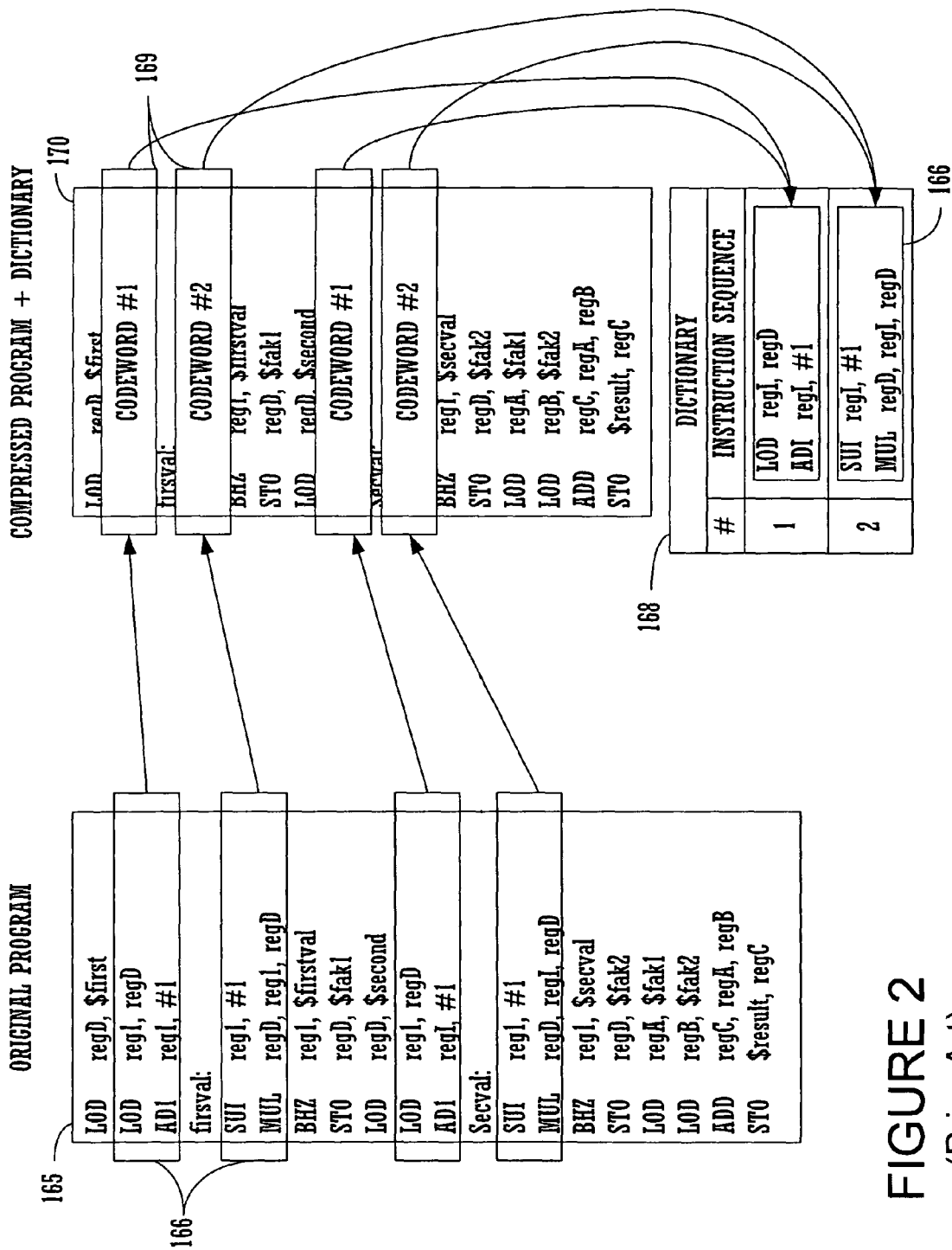
FIG. 2 is a conventional approach of dictionary-based compression techniques for improving code density.

In the following detailed description of embodiments of the present invention, automatically generating an instruction set from an architecture description, numerous specific details are set forth in order to provide a thorough understanding of the present invention. However, it will be recognized by one skilled in the art that the present invention may be practiced without these specific details or with equivalents thereof. In other instances, well-known methods, procedures, and components have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying" or "receiving" or "generating" or "processing" or "permuting" or "computing" or "resolving" or "propagating" or "determining" or "maintaining" or "importing" or "storing" or "constructing" or "accessing" or "traversing" or "selecting" or "forming" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Architecture Description Language

The following discussion outlines aspects of the structure of an exemplary Architecture Description Language (ADL) in order to facilitate explanation and understanding of embodiments in accordance with the present invention. However, the present invention is not limited to using this exemplary ADL. The following exemplary ADL is substantially compliant with the LISA language (Language for Instruction Set Processors). A more detailed explanation of LISA and related software tools is provided in, "Architecture Exploration for Embedded Processors With LISA," by A. Hoffmann, H. Meyr and R. Leupers. Kluwer Academic Publishers, January 2003.

Table I illustrates an exemplary single operation, which may form part of a hierarchical architecture description of an embodiment of the present invention.

TABLE I

OPERATION DeclareSampleDoingJump
{
DECLARE
{
    a. GROUP direction = { forward || backward };
    b. INSTANCE register; //supposed to contain the jump
       address in this context
    c. LABEL offset;

TABLE I-continued

```
}
/* note that the width of the jump-offset-label is stated in the
coding below, NOT in the declaration of the LABEL above */
CODING { direction offset=0bx[16] register }
.
.
.
}
```

In particular, an exemplary single LISA operation is illustrated in Table I. In general, a LISA architecture description comprises two parts: a LISA operation tree and a resource specification. The resource specification describes memories, caches, processor registers, signals, and pipelines. There is not a resource specification in the example of Table I, as the resource specification is not necessary for deriving the instruction set.

The operation tree is a hierarchical specification of instruction coding, syntax, and behavior. Elements used in an Operation (except for globally introduced Resources, which are not relevant to the structures of the various section trees) are declared in the Operation's Declare section. Hence, the Declare-tree is a superset of all other LISA trees as each element used in any of the other sections is declared first. Therefore, analyzing the Declare section for elements that are present in a generic Coding section is a first task to achieve the goal of automatic Coding tree generation.

Table I provides a sample Operation comprising some Declare-statements and their use in Coding. Note that this example only presents Declare-elements relevant to the Coding, for example, Enums and References are omitted, as they are not needed for the Coding and do not have to be considered for automatic generation of the instruction set. Enums provide internal LISA language control flow elements and are not used for the Coding. References allow access to elements declared in the hierarchy above the Operation in which appear in; however, they are not used in the structure of the Coding in this implementation.

The name of the operation in Table I is DeclareSampleDoingJump. The DECLARE section 205 contains local declarations and announcements for a LISA operation. LISA Groups are the defining elements of the Coding tree structure, as they represent a choice of Operations to be selected by the decoder. Therefore, in the LISA-language Groups appear in the Coding section, so all Group-member-Operations contain Coding themselves. The decision as to which Operation out of a Group is actually chosen in the current instruction context is defined by the Coding of the Group-member-Operation. However, this definition may be direct (e.g., a terminal binary opcode is given in this Group-member-operation distinguishing it from all other Group members) or indirect (e.g., the terminal opcode is not given in the Group-member-Operation itself, but in one of its descendant-Groups or Instances). Each LISA-description may use either the direct or indirect definition, or hybrid forms of them. This leads to at least two different embodiments of structuring the terminal instruction encoding throughout. Those embodiments are referred to herein as local encoding and global encoding. Other embodiments use a mix of local and global encoding. Encoding Group members efficiently is of major importance and is achieved by embodiments of the present invention.

The CODING section 210 in Table I describes the binary image of the instruction word that is a part of the instruction set model. LISA Instances are often used in Coding sections with resemblance to Groups only containing one member. Different from the Group-statement though, the LISA-compiler does not enforce Instances declared in an Operation to appear in its Coding. Thereby, Instances, for example, sometimes only contain Behavior sections to model the write-back stage of an instruction, which is not needed for the Coding. To differentiate between these usages and determine whether the Instance declared is to appear in Coding section, at least one of the two following conditions should be fulfilled:

Condition 1: The instantiated Operation contains elements that appear in the Coding. This is a recursive condition. If any of the elements relevant to the Coding according to the descriptions in this chapter appear in the Operation, it appears in the Coding section of each Operation it is instantiated in.

Condition 2: The Operation declared as an Instance is declared within a group in another Operation, and thereby contains a Coding section. Because of the recursive condition in Condition 1, the Operation used as an instance in this case, is inserted into the instantiating Operation's Coding section for global Coding consistency.

As LISA Labels define nonterminal operand fields in an instruction, they appear in Coding. Labels usually represent the "payload" the designer wants to convey in a certain Operation. For example, the payload may be immediate operands, flags, etc. As a consequence for the automatic Coding generation of embodiments of the present invention, Labels define a preset instruction width that plays an important role when determining opcodes assigned to an instruction for a efficient total instruction width.

In order for the automatic Coding generation of an embodiment of the present invention to be able to consider Labels correctly, the designer specifies at least a rudimentary Coding section containing all Labels declared (other elements may be omitted though). This is because that in accordance with the LISA language syntax the binary width of a label is not included in its Declare statement but provided in the Coding section itself. It will be understood that not all embodiments of the present invention have this requirement, as the present invention is not limited to the LISA language. Moreover, the present invention is also suitable for potential modifications to the LISA language.

The architecture designer typically provides element declarations for the architecture properties the architecture designer would like to model in Activation or Behavior/Expression sections. For each declared item it can be clearly determined if its presence in the instruction set is necessary. So except for Labels, no explicit Coding-section has to be specified. Thus, in accordance with an embodiment of the present invention, all information on the elements that appear in the Coding can be extracted from the structure of the relevant parts of the Declare sections.

It will be understood that the present invention is not limited to the exemplary LISA ADL depicted in Table I, which possesses hierarchical aspects. Those of ordinary skill in the art will recognize that other ADLs exist that posses hierarchical aspects. The present invention is suited to any ADLs possessing hierarchical aspects.

Local Encoding Computer Implemented Algorithm

An embodiment of automatic instruction set generation is based on encoding local groups. This embodiment will be explained by reference to an example using the LISA language. However, the principles of this embodiment are applicable to other ADLs having hierarchical aspects, as those of ordinary skill in the art will appreciate. The approach of this embodiment ignores the global Declare graph structure, generating and optimizing Coding on local level only.

This embodiment will make all Operations in a Group directly distinguishable via terminal Coding symbols. When the decoder makes a choice recursing into a Group, it can identify the correct Operation via a terminal Coding symbol that matches a bit-pattern in the given instruction. In this way, Groups are regarded as a "micro-instruction-set" for which the same principles would apply as would for a "global" instruction set. This implies at least two major advantages. First, the overall width of the Group is reduced. In one aspect of the invention, the overall width is as small as possible. Second, all Group-member-Operations are automatically encoded to the same binary width (e.g., opcodes are padded with don't-care-bits if necessary).

FIGS. 3A-3E illustrate an exemplary data structure 400 showing recursive encoding and width propagation in accordance with an embodiment of the present invention. This embodiment is referred to herein as local encoding. In this embodiment, the data structure is divided into groups with each group being encoded individually. The encoding process starts at the leaf level and works up to the root, passing bit-width information up for use in encoding higher level groups.

Figure 3A:
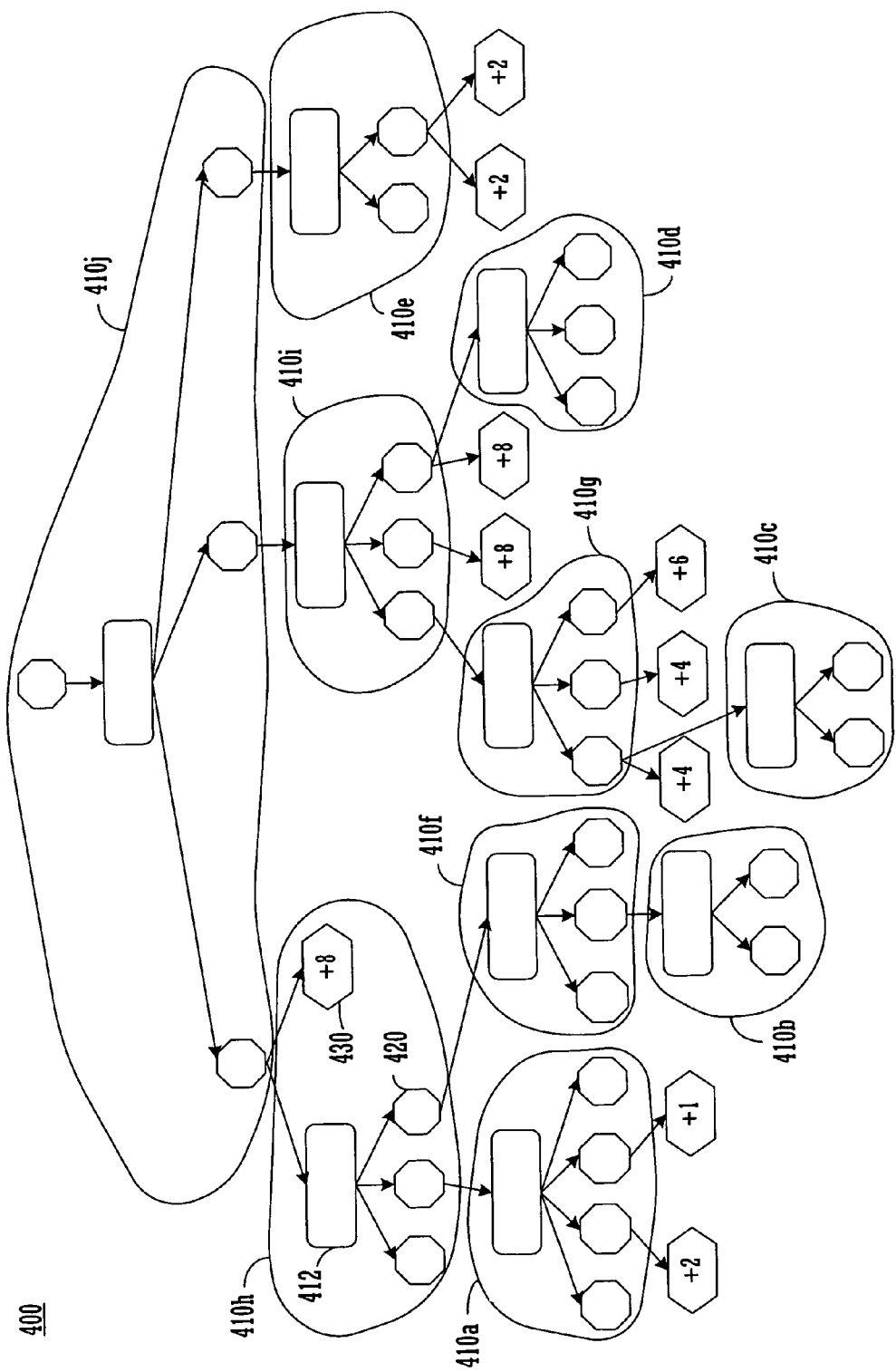
FIGS. 3A, 3B, 3C, 3D, and 3E illustrate an exemplary data structure showing recursive encoding and width propagation, in accordance with an embodiment of the present invention.

Referring to FIG. 3A, the local Group-encoding is started in the Groups that comprise the leaves of the data structure 400. The exemplary data structure 400 may be formed from an ADL description, such as the exemplary description in Table I. In this example, the data structure 400 is a tree, although more generally, the data structure may be a directed graph. The exemplary data structure comprises groups 410a-410j, which comprise one or more operations 420. An operation 420 may have a label 430 associated with it. An encoded width 412 is determined for each group 410, in this embodiment. The label 430 may be a payload, for example, a flag or immediate operand. The label 430 may represent a nonterminal operand field in the Coding. In FIG. 3A, the labels 430 have values such as, "+4", indicating the number of bits for the payload. A single instruction in the instruction set is defined by a unique path from the root of the data structure 400 to a leaf operation 420. Note that a group 410 is a sub-graph of the data structure 400. However, a sub-graph can comprise more than one group 410.

Figure 3B:
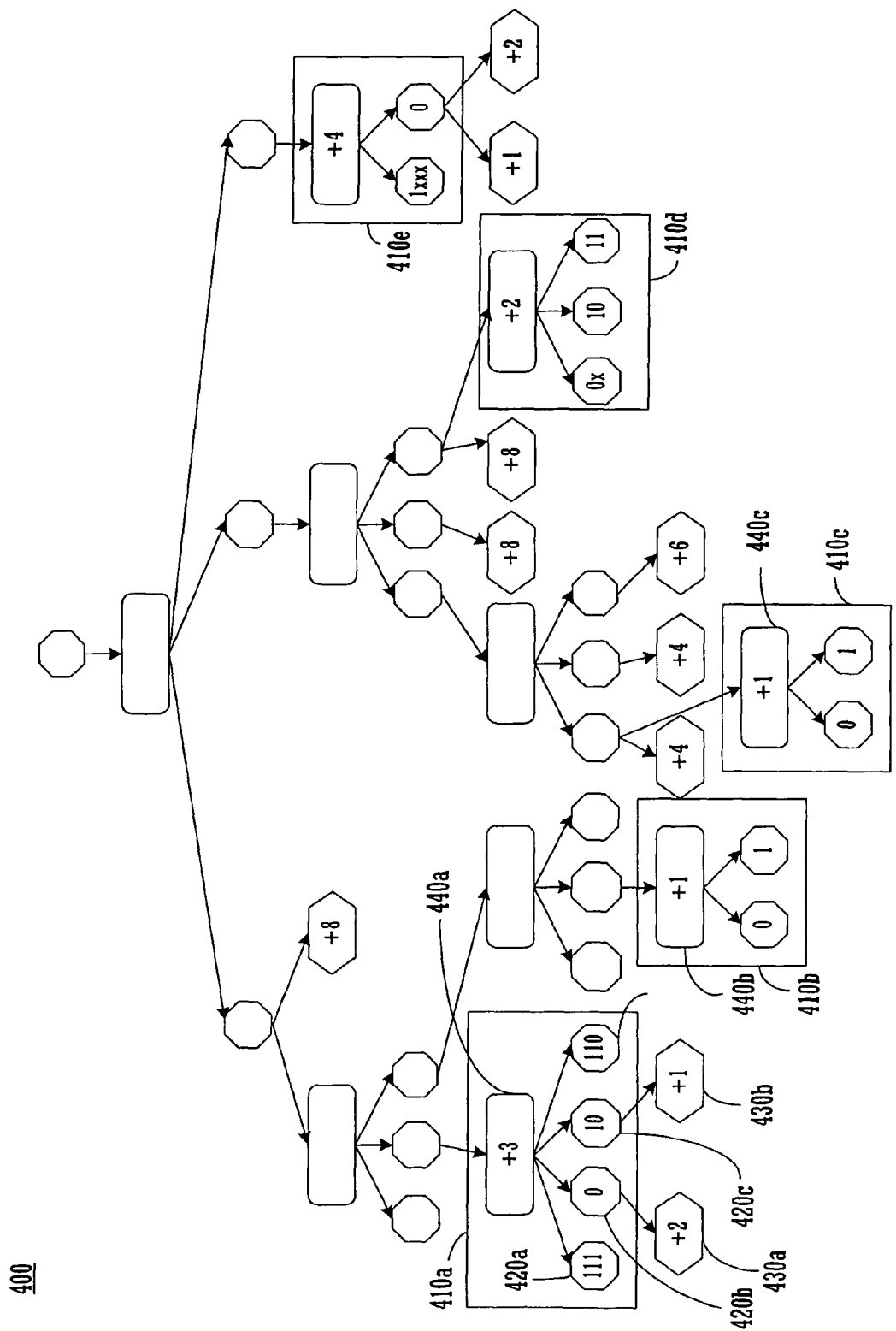

FIG. 3B illustrates encoding groups at the leaf level. Referring to the data structure 400, this means that encodings are determined for operations 420 that do not have groups 410 as children. For example, an opcode is determined for each operation in groups 410a-410e. Furthermore, a width value is calculated for each group 410a-410e. The width value reflects the various payloads (e.g., labels 420) and the opcodes. For example, Group 410a has a width of three bits. Note that operations 420a and 420d have three bit opcodes, operation 410c has a two-bit opcode and a one-bit payload 430b, and operations 410b has a one-bit opcode and a two-bit payload 430a. Thus, all operations in group 410a have a total of three-bits for their opcode/payload combination. Note that other groups 410b-410e do not have a bit-width of three-bits. The bit-width for each group 410 will be propagated to parent groups 410 when those groups 410 have their opcodes determined.

Figure 16:
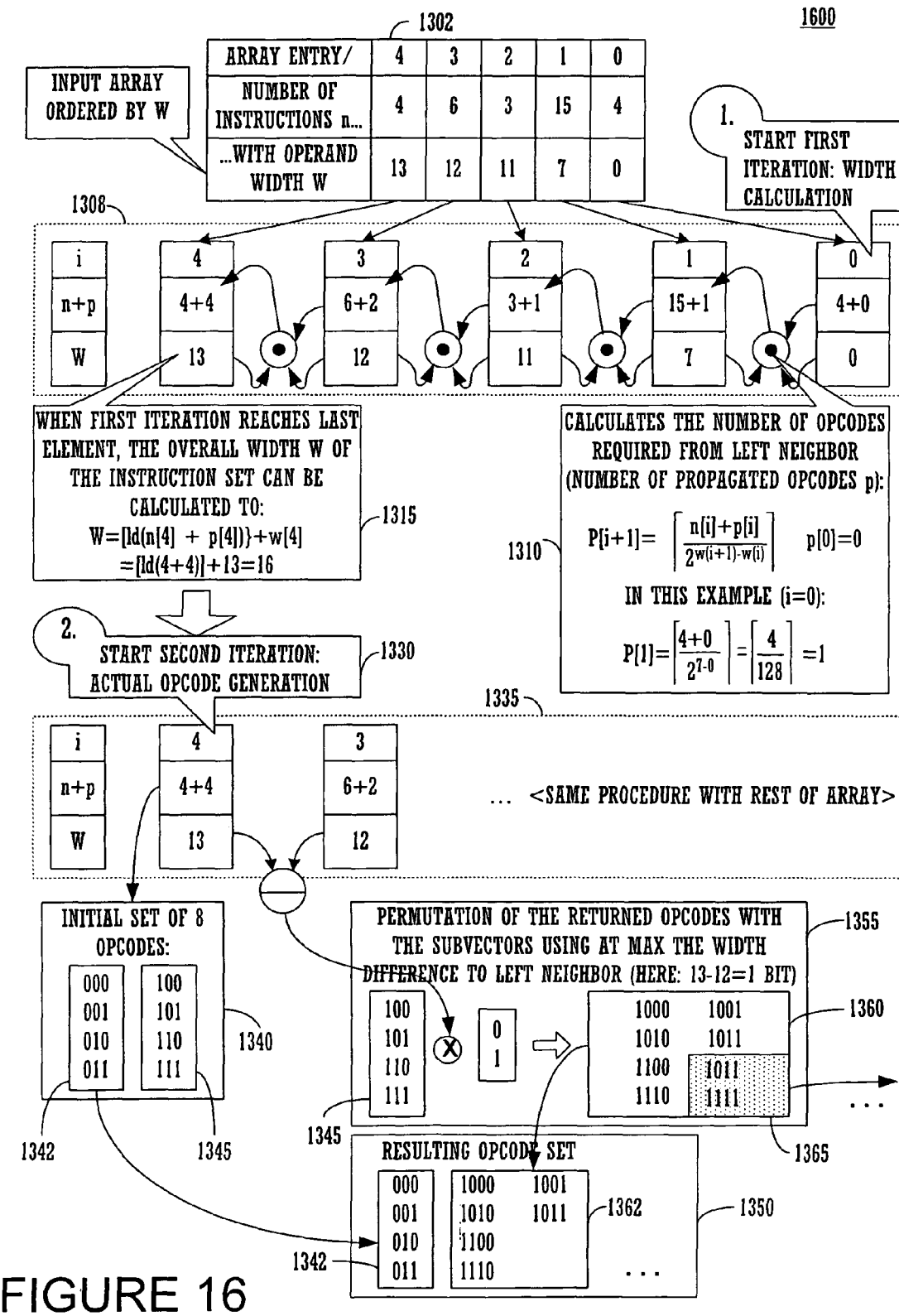
FIG. 16 is a diagram illustrating steps of a process of opcode generation and bit-width calculation, in accordance with an embodiment of the present invention.

In one embodiment, the process 1600 of FIG. 16 is used to determine the encodings for the operations and the group widths. Briefly, the process 1600 of FIG. 16 is applied once for each group 410 in data structure 400. The process 1600 inputs an array comprised of the number of instructions that have a given operand width. For example, for group 410a, the input array is depicted in Table II.

TABLE II

| Entry | 2 | 1 | 0 |
|---|---|---|---|
| Number of Instructions | 1 | 1 | 2 |
| with operand width "n" | 2 | 1 | 0 |

Entry "0" in Table II indicates that two instructions have width "0". Those two instructions are operations 420a and 420d in FIG. 3B, as they do not have a payload. Operation 420c in FIG. 3B has a payload of one bit and is reflected as entry "1" in Table II. Operation 420b in FIG. 3B has a payload of two bits and is reflected as entry "2" in Table II. The process 1600, which will be discussed in detail herein, outputs the encodings of the operations and the width of the group. The present invention is not limited to process 1600 for determining encodings and bit-widths. Thus, the encodings and bit-widths may be determined in any suitable fashion.

Figure 3C:
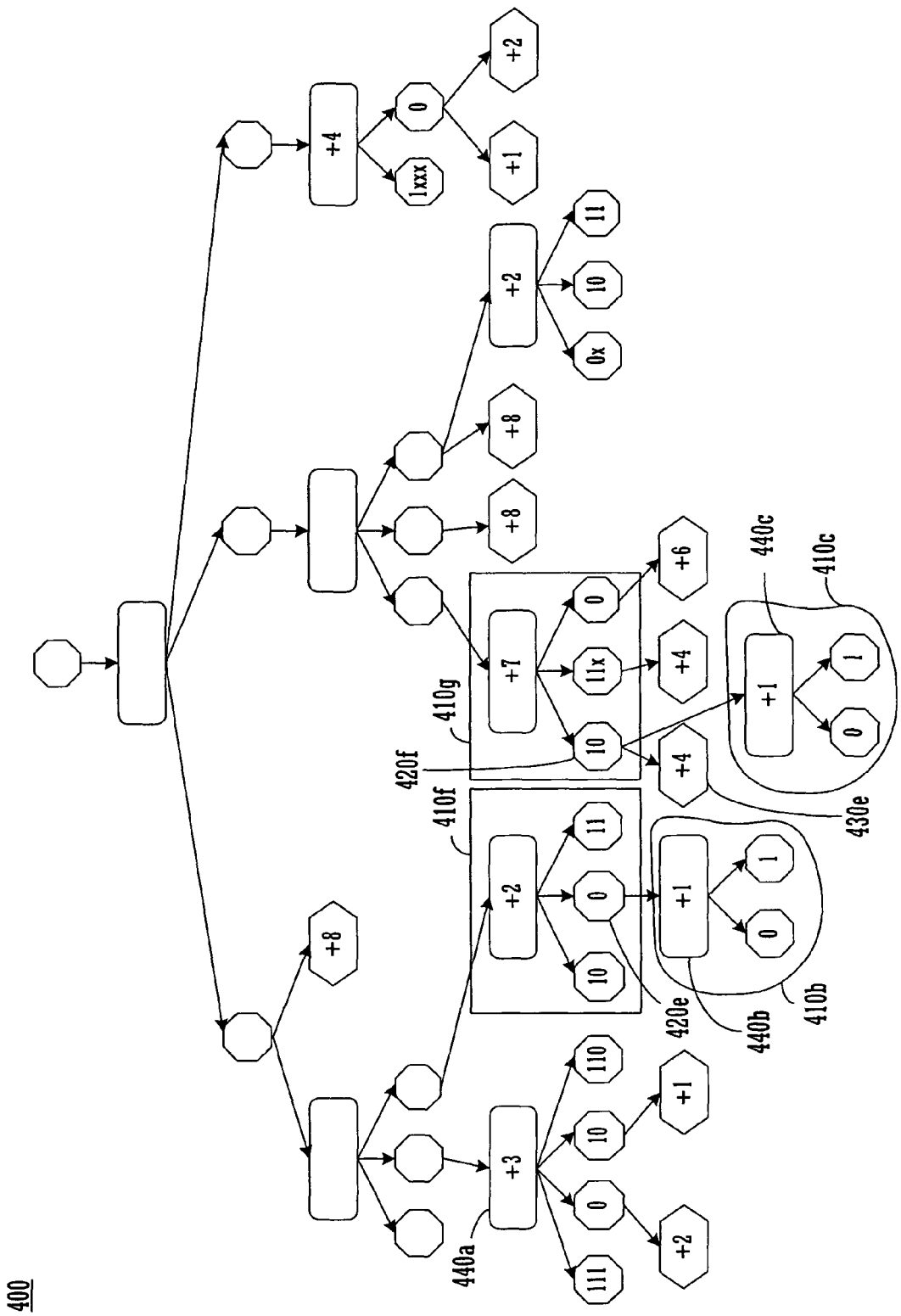

In FIG. 3C encoding and bit-widths are determined for groups at the further up the data structure 400, as compared to the groups encoded in FIG. 3B. Moreover, bit-width information from prior encoding is passed up for this encoding. However, it is possible for encodings at a higher level that the leaf level to use bit-width information that was not passed up from a previous encoding.

In FIG. 3C, encodings are determined for groups 410f and 410g. Note that operation 420e has a "payload" of one bit, which arises due to the bit-width of its child group 410b. Thus, in general, the encoding widths of Groups will be propagated to the Operations in which they occur, thereby contributing to the width parameter that is to be passed to the encoding computer implemented algorithm when a parent Group is to be encoded. Further elements contributing to this parameter are Labels. Thus, for example, operation 420f has a label 430c with a width of "+4" and group 410c with a bit-width of one-bit (440c). Therefore, the total payload for operation 420g is five bits, for purposes of determining it encoding and that of other operations in its group 410g.

Figure 3D:
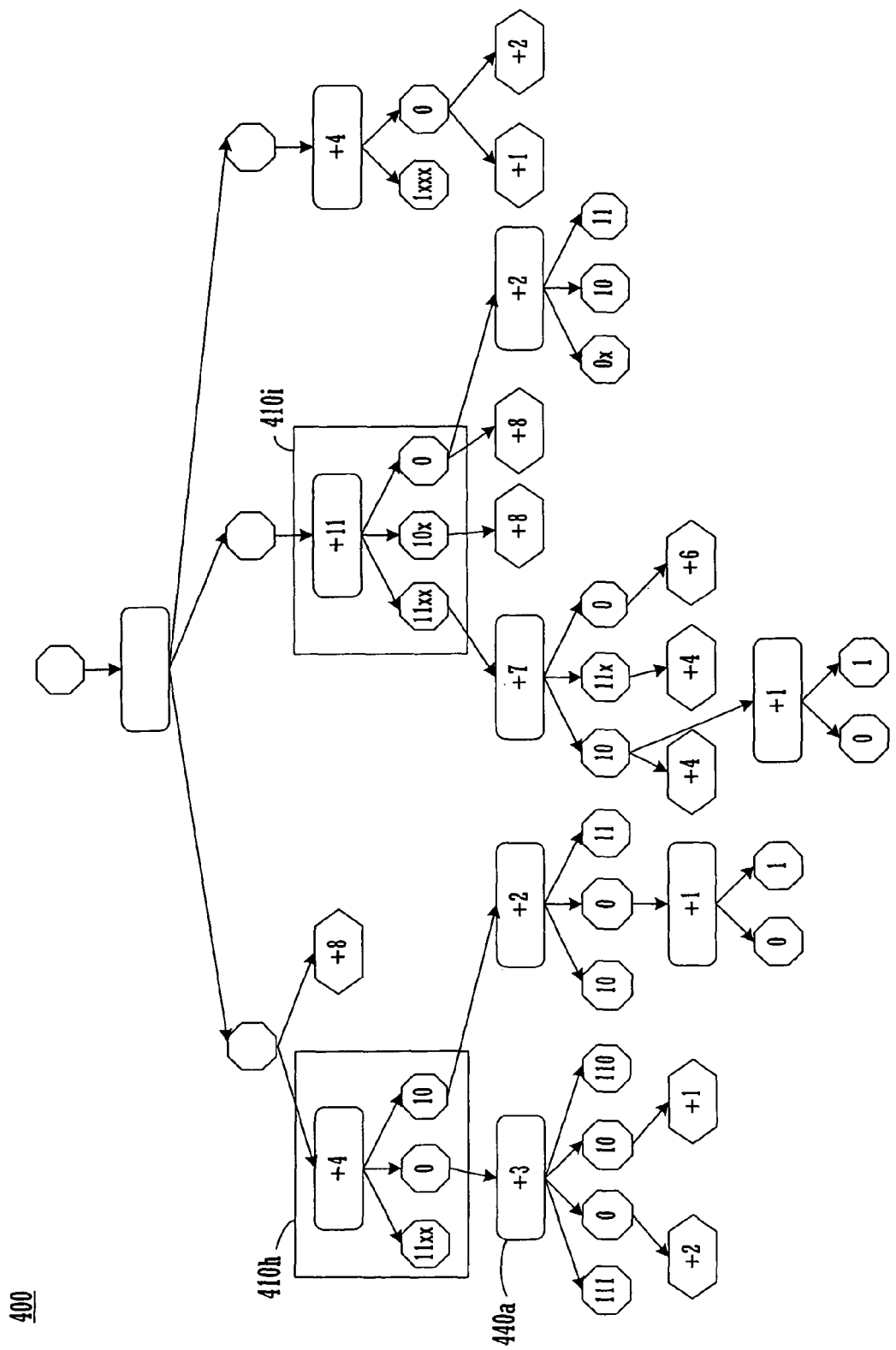

In FIG. 3D, encoding and bit-widths are determined for groups 410h and 410i, which are at the next level up the data structure 400, as compared to the groups encoded in FIG. 3C.

Figure 3E:
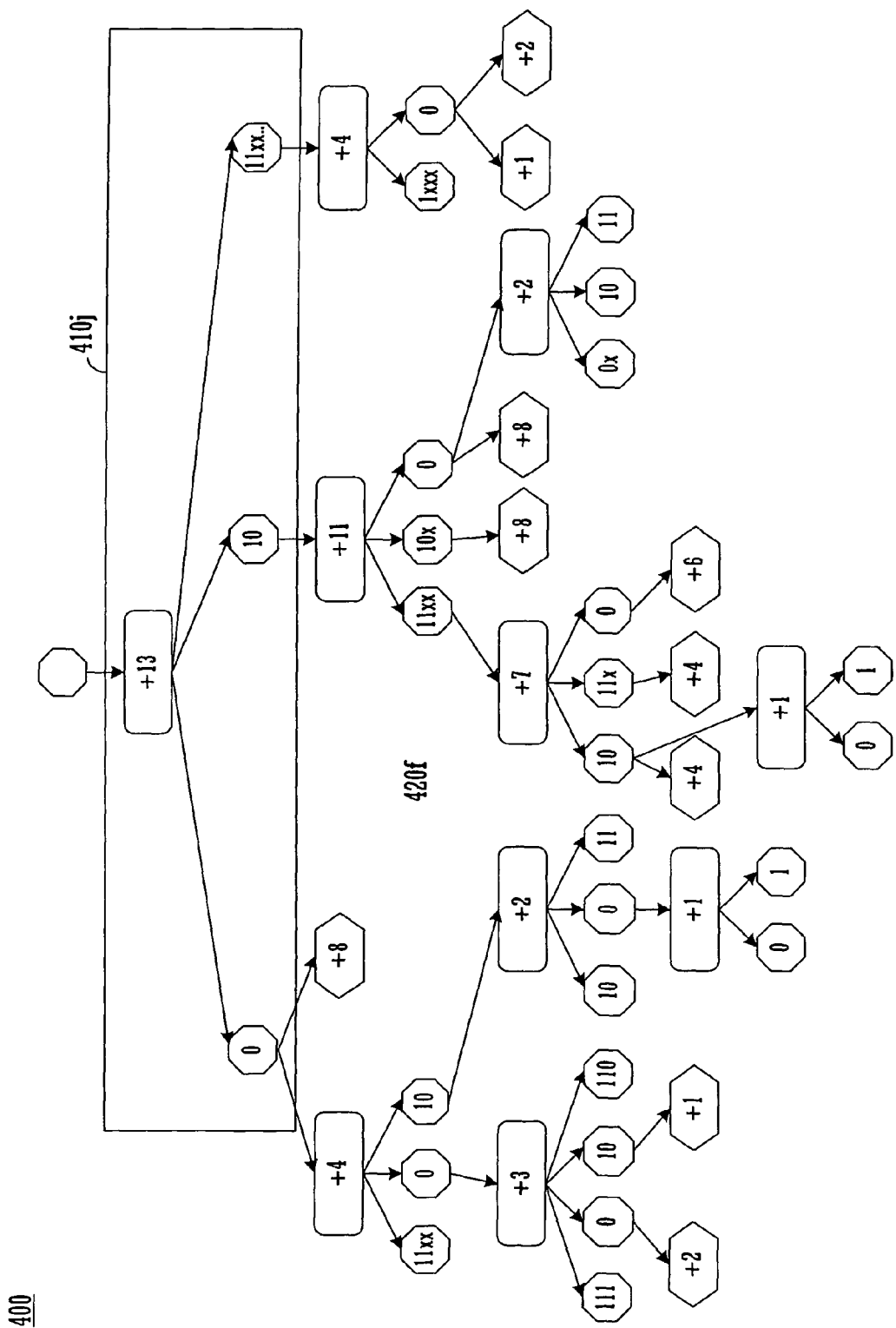

In FIG. 3E, encoding and bit-widths are determined for group 410j at the root of the data structure 400. This concludes encoding. The total encoding for a particular instruction is found by concatenating the partial encoding of operations moving from the root to a given leaf operation.

Figure 4:
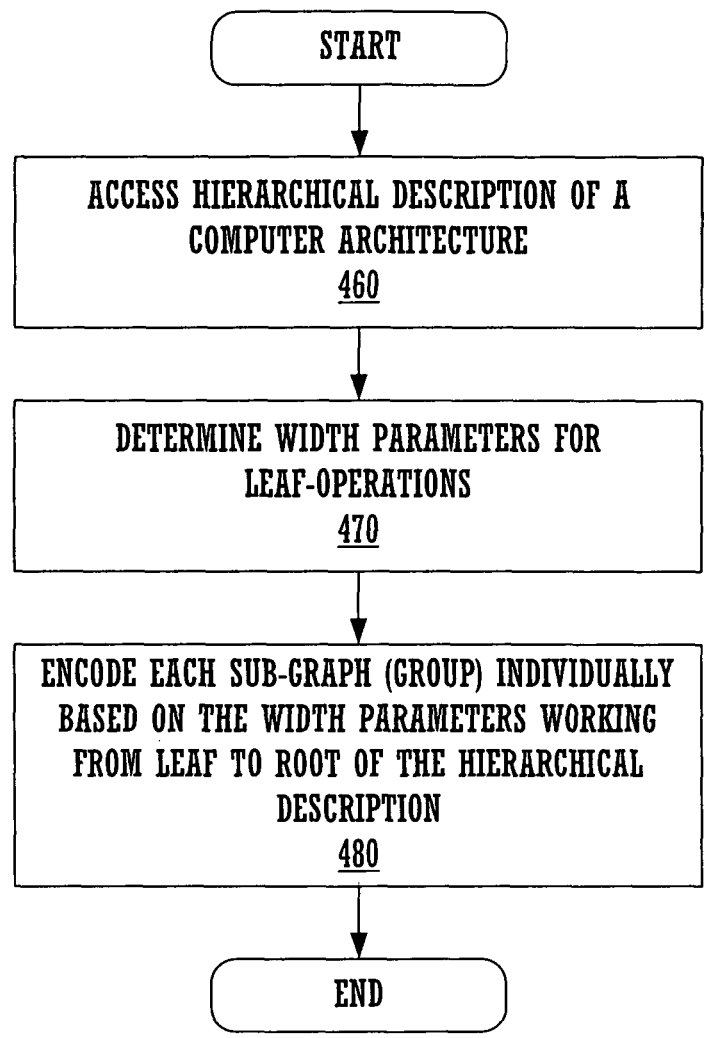
FIG. 4 is a flowchart illustrating steps of a process of automatically generating an instruction set from a hierarchical description, in accordance with an embodiment of the present invention.

FIG. 4 is a flowchart illustrating steps of a process 450 of automatically generating an instruction set from a hierarchical description, in accordance with an embodiment of the present invention. In step 460, a hierarchical description for an architecture description is accessed. For example, a data structure such as exemplary data structure 400 of FIG. 3A is accessed. The data structure comprises a plurality of sub-graphs, wherein said sub-graphs comprise one or more operations.

In step 470, width-parameters are determined for operations in leaf sub-graphs. In one embodiment, sub-graphs of the graph structure at lowest level are identified. For example, in FIG. 3B, groups 410a-410e are identified. Further, payload width parameters for each of the sub-graphs at the lowest level based on payloads are identified. For example, referring to FIG. 3B, group 410a has two labels 430a and 430b. Each labels describes a payload width parameter. In this case, each payload width parameter is associated with one of the operations 420 in group 410. Not all operations have a payload width parameter.

In step 480, each of the sub-graphs is encoded individually based on the width parameters traversing from leaf to root of the hierarchical description. The encoding generates a width parameter for each sub-graph that is propagated to a parent of that sub-graph. Thus, operation codes and an encoded width parameter are determined for each of the sub-graphs based on the payload width parameters and operations in each sub-graph. FIG. 3B illustrates a portion of step 480, in which operation codes and an operation width parameter are annotated to groups 410a-410e. The manner of determining the operation codes and an operation width parameter is not critical. In one embodiment, the process 1600 of FIG. 16 is used, as described herein.

FIG. 3C illustrates propagating encoded width parameters to respective parent sub-graphs, in accordance with step 480. For example, referring to FIG. 3C, encoded width parameters 440b and 440c are propagated to groups 410f and 410g, respectively. Note that encoded width parameter 440a is not used until FIG. 3D because group 440h is not encoded until its level of the data structure 400 is encoded.

The encoding continues up the data structure, propagating encoded width parameters as the payload width parameters until reaching a root of the graph structure. By using the propagated encoded width parameters as the payload width parameters it is meant that the propagated encoded width parameters are used as input width parameters in a process that determines encodings and new encoded width parameters. Label width parameters may also be used in the determination of the operation codes and encoded width parameters. For example, group 410g in FIG. 3C has label width parameters associated with it (e.g., 440b) that are used along with propagated encoded width parameter 440c to determine encoding and the encoding width parameter for group 410g. Eventually, the root of the data structure is reached and coding is compete, as depicted in FIG. 3E, for example.

Merger of Multi-Occurrence Operations

As previously discussed, the topology of the data structure from which the instruction set is constructed is not necessarily a tree, but may be graph. A reason a graph structure results is that Operations can occur in more than one Group. For example, the code in Table III illustrates the problem for a simple Group-configuration.

TABLE III

OPERATION sampleOP
{
DECLARE
    d. {
    e. GROUP group1 = { OpA || OpB };
    f. GROUP group2 = { OpA || OpC };
    g. GROUP group3 = { OpB || OpC };
    h. }

Referring now to Table IV, note that Operation A is shared between Groups 1 and 2. Operations B and C are also shared between various groups. An embodiment of the present invention makes the following two observations. First, for Groups containing Operations that also occur in other Groups, all occurrences are considered. Second, the width of the binary encoding for the Group-members may be wider than a first and isolated look upon a single Group may suggest.

TABLE IV

|  | OpA | OpB | OpC |
|---|---|---|---|
| Group 1 | X | X |  |
| Group 2 | X |  | X |
| Group 3 |  | X | X |

Therefore, this embodiment merges Groups that are linked via Multi-Occurrence-Operations to a single Group, thereby ensuring definite and distinguishable encoding of all Operations affected. For example, the solution would look like presented in Table V.

TABLE V

|  | OpA | OpB | OpC |
|---|---|---|---|
| MergerGroup | 0b00 | 0b01 | 0b1x |

This approach however does not necessarily lead to the most compact instruction word. For example, the groups in the exemplary code of Tables VI have common operations as depicted in Table VII.

TABLE VI

OPERATION OPexample
{
DECLARE
    i. {
    j. GROUP groupA = { Op1 || Op2 };
    k. GROUP groupB = { Op1 || Op3 };
    l. GROUP groupC = { Op1 || Op4 };
}

TABLE VII

|  | Op1 | op2 | Op3 | Op4 |
|---|---|---|---|---|
| GroupA | x | x |  |  |
| GroupB | x |  | x |  |
| GroupC | x |  |  | x |

The merging of the original Groups of Table VII results in a Merger Group comprising four Operations, thereby requiring a binary encoding of two bits width, as shown in Table VIII.

TABLE VIII

|  | Op1 | op2 | Op3 | Op4 |
|---|---|---|---|---|
| Merger Group | 0b00 | 0b01 | 0b10 | 0b11 |

However, another embodiment of the present invention is able to reduce the bit-width to one-bit by making the following observations. Observing the original Groups reveals that by encoding all Groups separately one after another, a working encoding is produced. Furthermore, this variant is only one bit wide. This is because except for Operation Op1 all Operations are unique to the Groups in which they occur. Hence, they can be encoded identically. Table IX illustrates an exemplary solution in accordance with this embodiment.

TABLE IX

|  | Op1 | op2 | Op3 | Op4 |
|---|---|---|---|---|
| GroupA | 0b0 | 0b1 |  |  |
| GroupB | 0b0 |  | 0b1 |  |
| GroupC | 0b0 |  |  | 0b1 |

Therefore, an embodiment of the present invention provides a more general solution to this problem. As a result from the preceding considerations, it is now clear that Operations that are unique to a certain Group can be encoded with the same binary values. Formulating this in a more general way: Operations within a merger-Group that are orthogonal concerning their Group-configuration can be encoded identically. By orthogonal it is meant Operations that never occur in the same Group together. For example, in Table VII, op2, op3, and op4 are considered orthogonal.

The implementation of this more general approach is an embodiment that may be referred to as a "smart-merger" function that checks each new Operation that is to be inserted into the merger-Group for orthogonality to one of the Operations that are already in the merged Group. If an orthogonal Operation is found, the two are joined to a "virtual Operation" in the merger-Group. When finally encoding this Group, only the "virtual Operations" are considered for encoding. Once terminal Coding has been assigned to them, all "real" Operations within the virtual Operation are assigned with that very Coding.

Figure 5A:
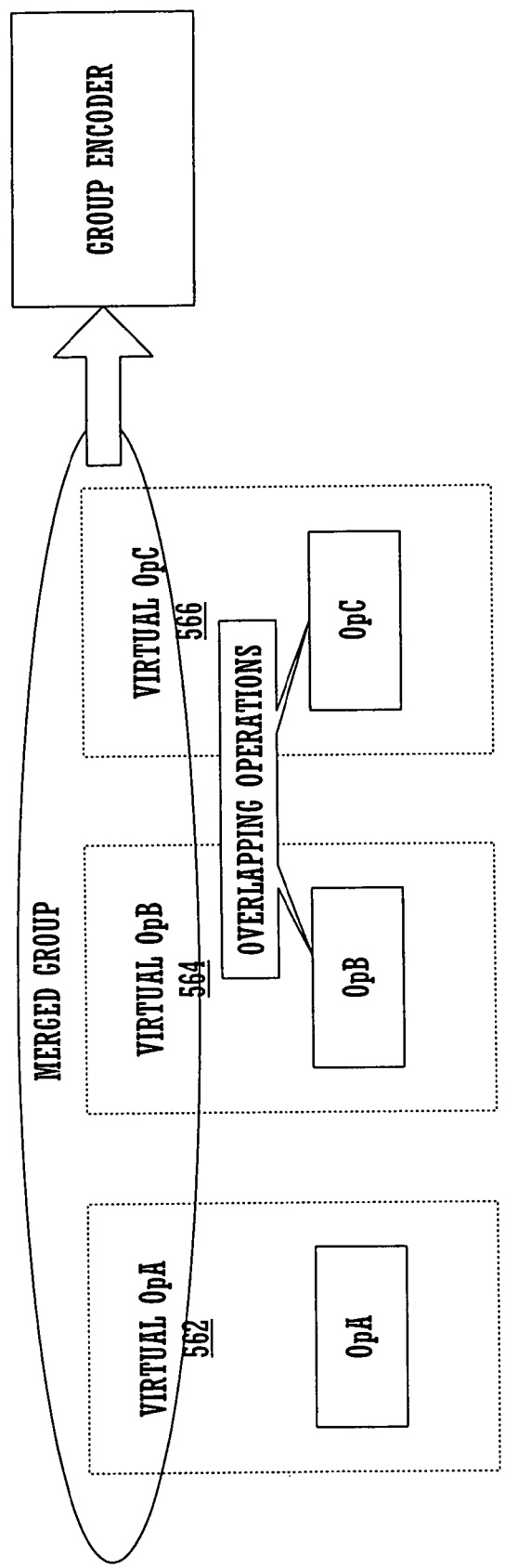
FIG. 5A and FIG. 5B depict group merger into virtual operations in accordance with an embodiment of the present invention.
Figure 5B:
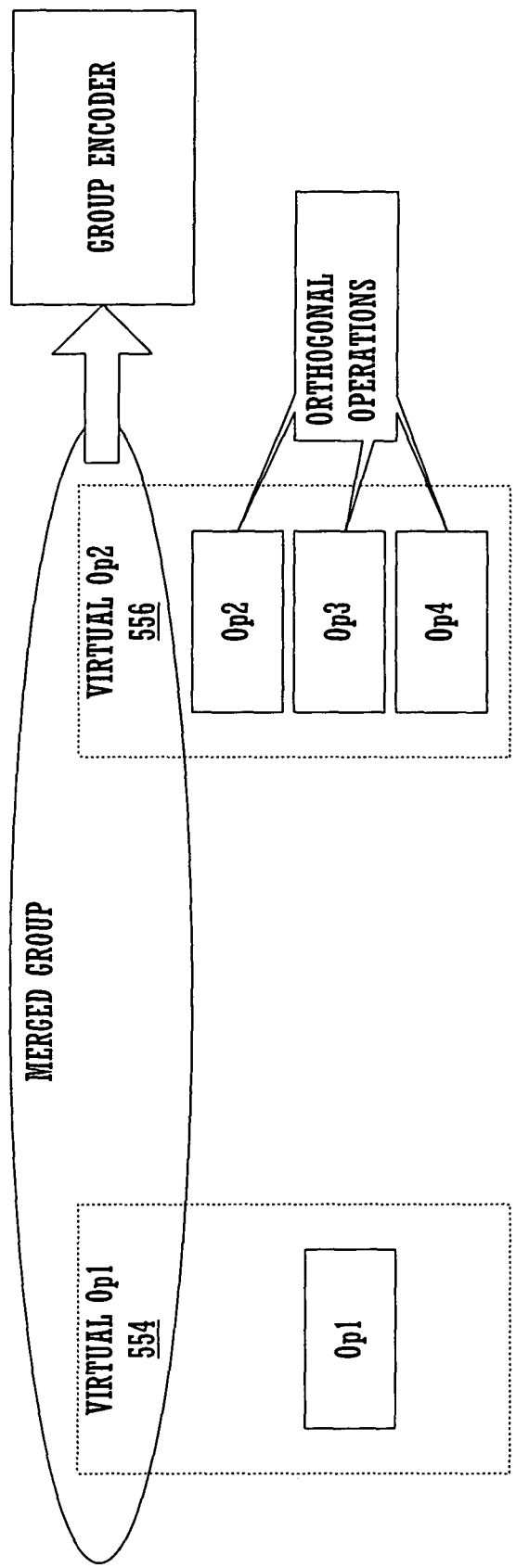

This merging computer implemented algorithm embodiment is illustrated in FIGS. 5A and 5B for example configurations of Table III and Table V, respectively. In FIG. 5A, virtual Op1 554 comprises real operation Op1. Virtual Opt 556 comprises real operations Op2, Op3, and Op4. Note the correspondence to Tables VII and IX. In FIG. 5B, virtual OpA 562 comprises real operation OpA, virtual OpB 564 comprises real operation OpB, and virtual OpC 566 comprises real operation OpC. Note the correspondence to Tables IV and V.

Operations within such a "virtual Operation" are of the same payload-width to assign them with identical terminal Coding. If they vary in width, they are padded with don't-care-bits to the width of the widest Operation in the virtual Op. This is done as only the virtual Ops are considered when generating the opcodes that could comprise Operations of different operand widths.

Note that the encoding computer implemented algorithm of process of F*igure* 1600 uses a specific payload-width-parameter for each Operation. If a value shorter than the maximum value were used, the condition that all Operations in a Group are of the same width would not be fulfilled. This is caused by a "real" Operation growing longer when finally assigning the encoded binary value to it. Shorter Operations on the other hand can easily be padded with don't-care-bits after encoding. Using this technique ensures that all terminal Codings within a Group are distinguishable, but the binary width of the encoding is not bloated unnecessarily when encoding Operations that are not occurring in all Groups involved. When using the local computer implemented algorithm embodiment for encoding and width-propagating described herein, the Groups linked via Multi-Occurrence-Operations are considered as a unity, meaning that once all sub-Groups of all merged Groups are complete, the merged Group can be encoded. Therefore, the dependencies between linked Groups are thoroughly observed when executing the local computer implemented algorithm embodiment.

Figure 6:
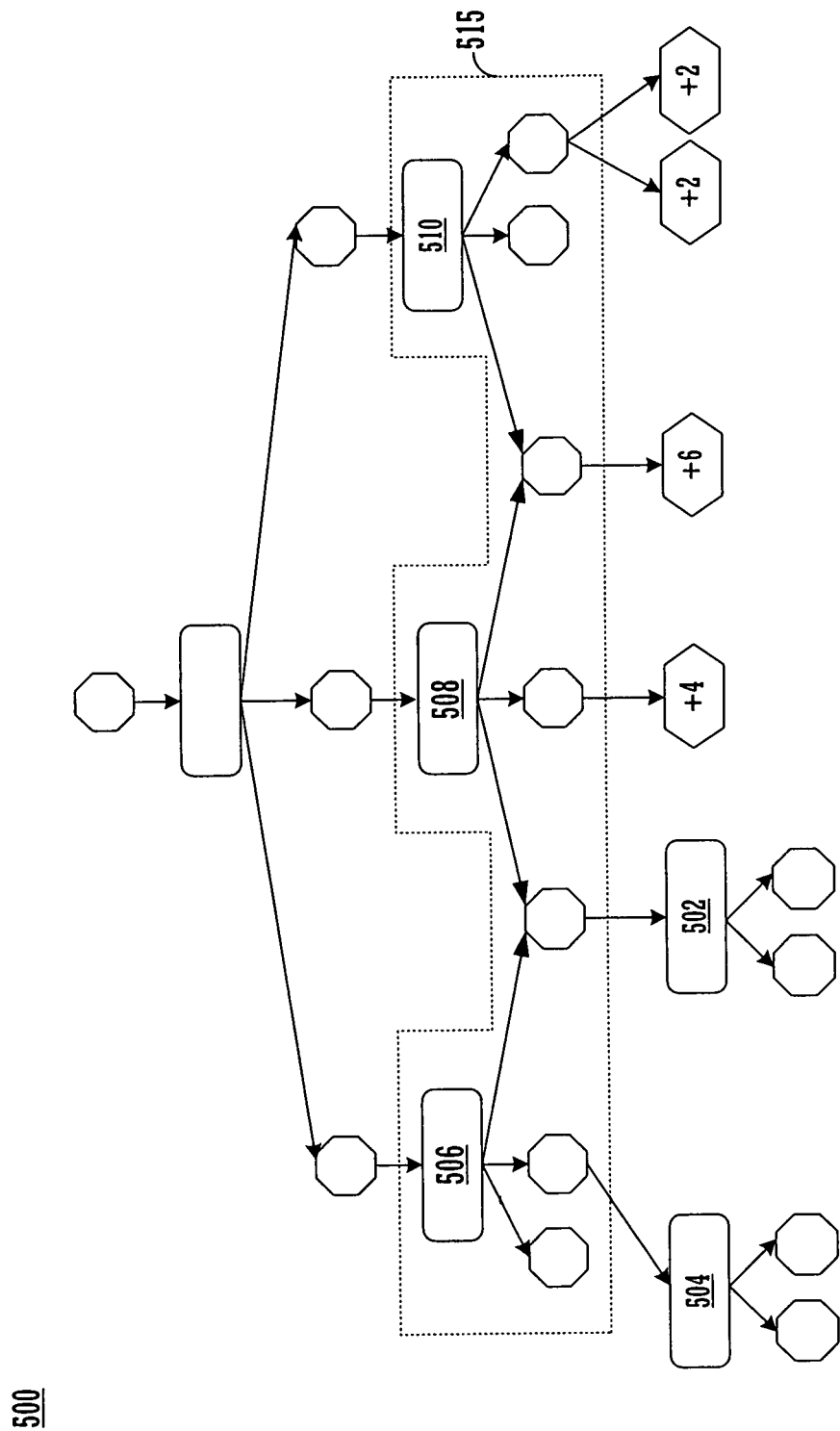
FIG. 6 depicts group merger in accordance with an embodiment of the present invention.

FIG. 6 illustrates how the local encoding computer implemented algorithm embodiment may be combined with the group merger embodiment presently being discussed. FIG. 6 illustrates a data structure 500 comprising groups that are merged. After encoding sub-groups 502 and 504, the merged groups 506, 508, and 510 are encoded as a single merged group 515.

Global Computer Implemented Algorithm

Another embodiment of the present invention employs a global computer implemented algorithm for determining an instruction set based on a hierarchical architecture description. This embodiment can lead to an instruction set of smaller width than the previously discussed local computer implemented algorithm. The previously discussed local computer implemented algorithm embodiment applies an encoding computer implemented algorithm to every group. For example, each operation in the data structure is encoded. However, such encoding is not mandatory in order to build a working instruction set. That is, a unique instruction set can be determined without encoding each group (and hence operations). The global computer implemented algorithm embodiment determines a unique instruction set without applying an encoding computer implemented algorithm to each group.

Figure 7A:
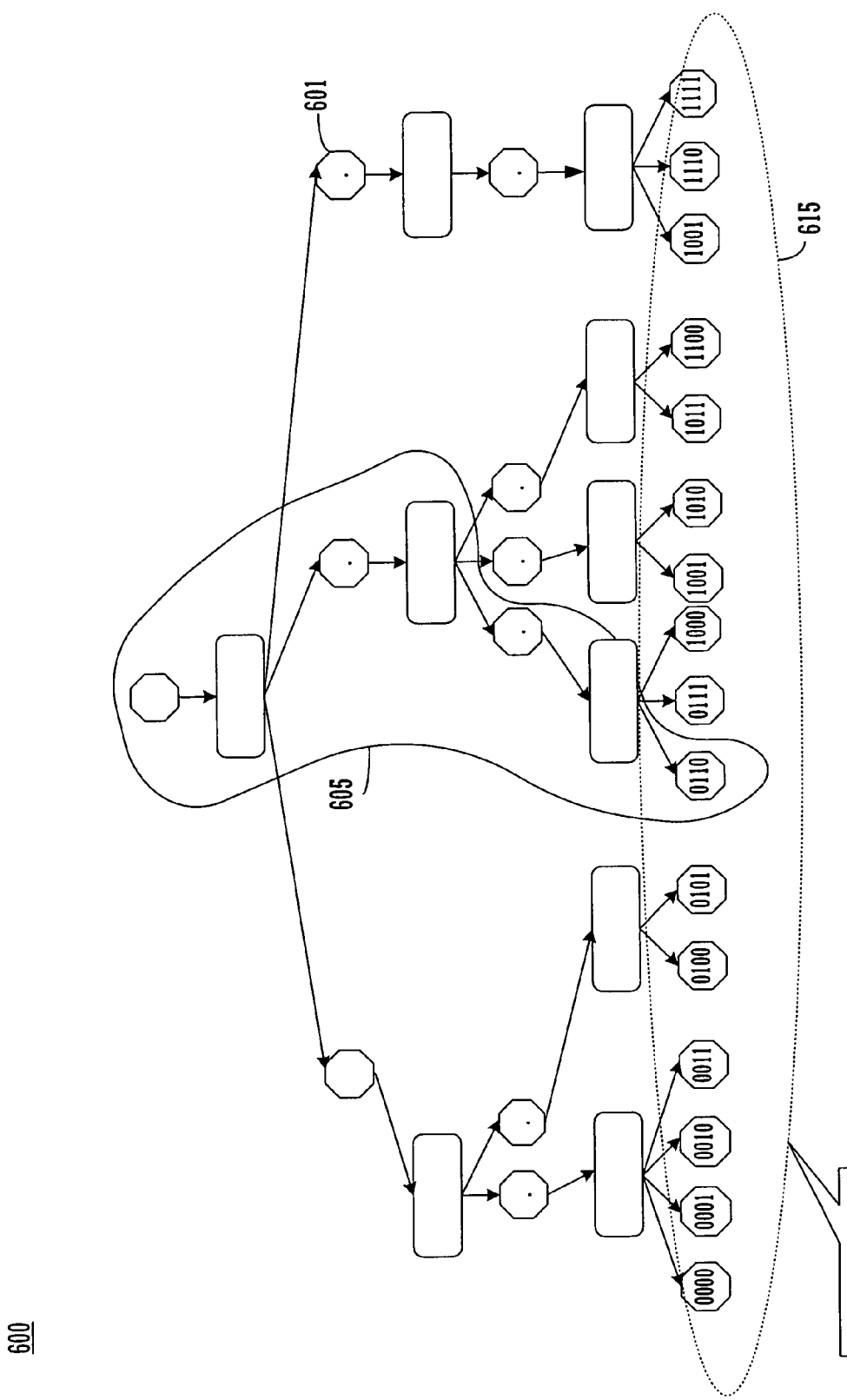
FIG. 7A illustrates an exemplary data structure showing global encoding in accordance with an embodiment of the present invention.

FIG. 7A illustrates an exemplary data structure 600 showing selection of which groups to encode via global encoding in accordance with an embodiment of the present invention. Note that some operations are not encoded, as indicated by the dots. For example, operation 601 is not itself encoded. However, the encoding of operations in the leaf group 615 suffice to produce an unambiguous instruction set. One step in the global computer implemented algorithm embodiment is to identify which nodes (e.g., groups, operations, etc.) are sufficient to encode such that a unique instruction set is obtained. For example, nodes in the data structure 600 compelled to carry terminal Coding are identified. This is done via determining where terminal Coding is necessary to keep all instructions distinguishable. In FIG. 7A those nodes are located in the leaf group 615, which are all at the leaf level. However, it is not always the case that only leaf nodes are encoded, as will be discussed further below.

A difference between a global encoding embodiment and a local encoding embodiment is that in a global encoding embodiment is not necessary that the binary encoding is distinguishable on each local Group level. Rather, it is sufficient that the binary encoding is unique for all Operations that are leaves of the tree. Thus, this global encoding embodiment can be implemented by combining all Leaf-Operations into a single Group and then encode the entire leaf group together. For example, referring to FIG. 7A, the encodings depicted for operations in the leaf group 615 may be determined together with a process such as process 1600 of FIG. 16. In contrast, a local computer implemented algorithm embodiment determines encodings for each local group separately. For example, the encodings depicted for operations in local groups (e.g., local groups 410*a*, 410*b* FIG. 4B) may be determined separately for each local group with a process such as process 1600 of FIG. 16 when applying the local computer implemented algorithm embodiment. However, it is not required that process 1600 be used. An aspect of a local computer implemented algorithm may merge groups and encode that merged group separately, as depicted in FIG. 6.

An instruction is defined by the path from the root of the data structure to a leaf. For example, path 605 illustrates a path for instruction. It may be sufficient to store the coding information in only the leaves, as all paths leading to the leaves may in some cases be non-ambiguous. This is the case for the data structure 600 in FIG. 7A. However, it is possible that ambiguities in the paths from root to leaf will be present in the data structure as first derived from the input ADL architecture description. For example, the data structure may be a directed graph rather than a tree. Techniques for handling such ambiguities are described herein.

Further, in an embodiment in which the LISA language is used, the LISA language compiler is able to propagate terminal information from the leaves of the tree to the root (or traverse down from the root to the leaves to identify the instruction). This implies that the terminal coding of each leaf would be unique. This principle can be extended to languages other than LISA. This allows building of the most compact instruction set coding, as no intermediate levels in the tree have to be encoded.

Figure 7B:
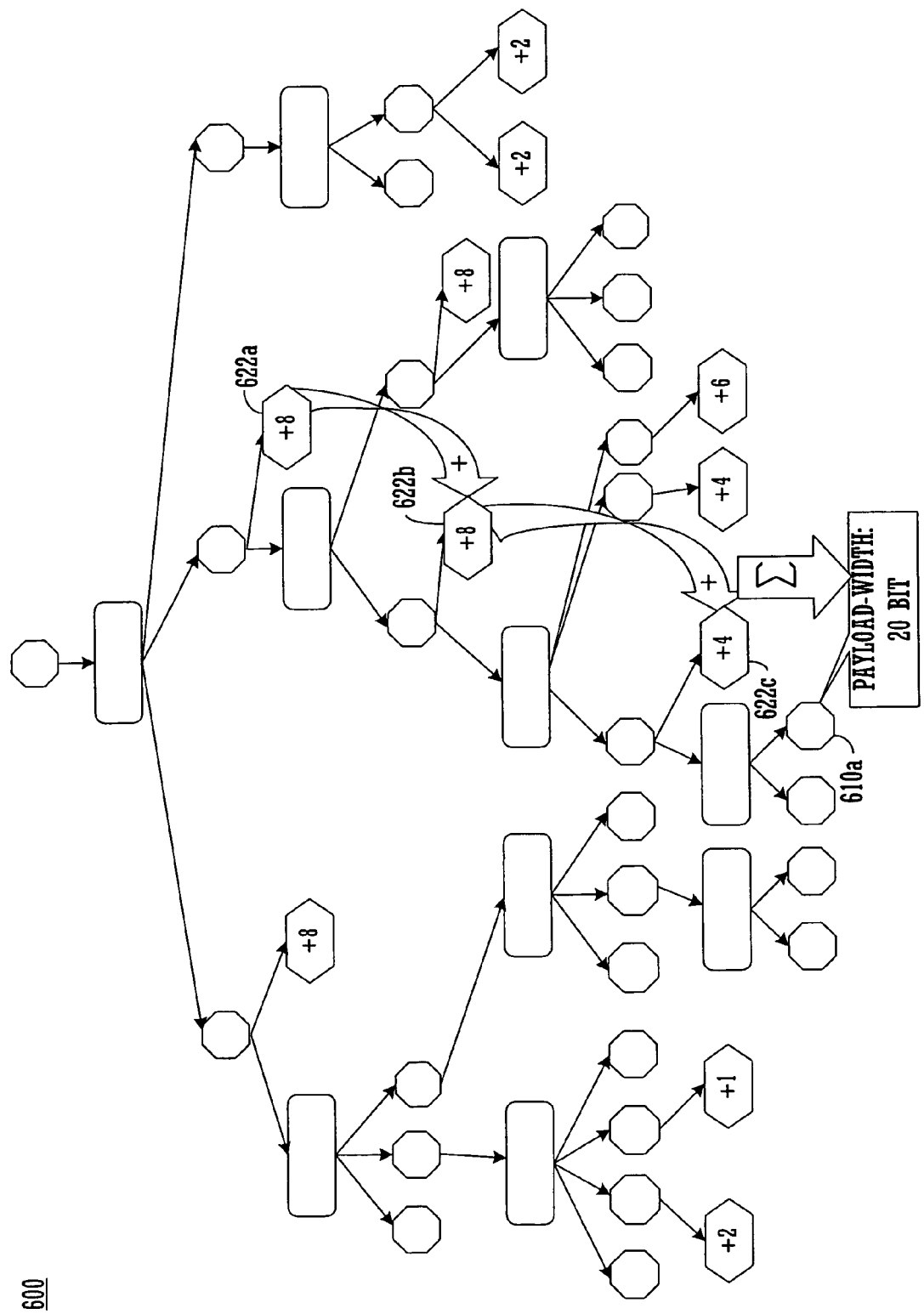
FIG. 7B illustrates an exemplary data structure showing global encoding with payload width propagation in accordance with an embodiment of the present invention.

Referring now to FIG. 7B, the payload width that is used when determining encodings is derived by traversing down the data structure 600 from the root to a leaf. For example, traversing data structure 600 from root to leaf operation 610*a* in FIG. 7B, labels 622*a*, 622*b*, and 622*c* are added together to arrive at a payload width of 20 bits. In a similar fashion, other paths from root to leaf operations are traversed, adding the value in the labels to arrive at a payload width. The payload width is input to an encoding computer implemented algorithm.

Thus, whereas in a local computer implemented algorithm embodiment nonterminal widths are propagated up the data structure to parent groups to use in an encoding computer implemented algorithm, in a global computer implemented algorithm embodiment nonterminal label-widths of all operations in the path leading down from the root to the leaf are summed up and passed as the width-parameter for the leaf-operation to an encoding computer implemented algorithm. Because an instruction is uniquely defined by a unique path through the data structure 600, all operand-payload of the complete instruction is factored into the encoding.

Path Encoding of Multi-Occurrence Operations

Figure 8:
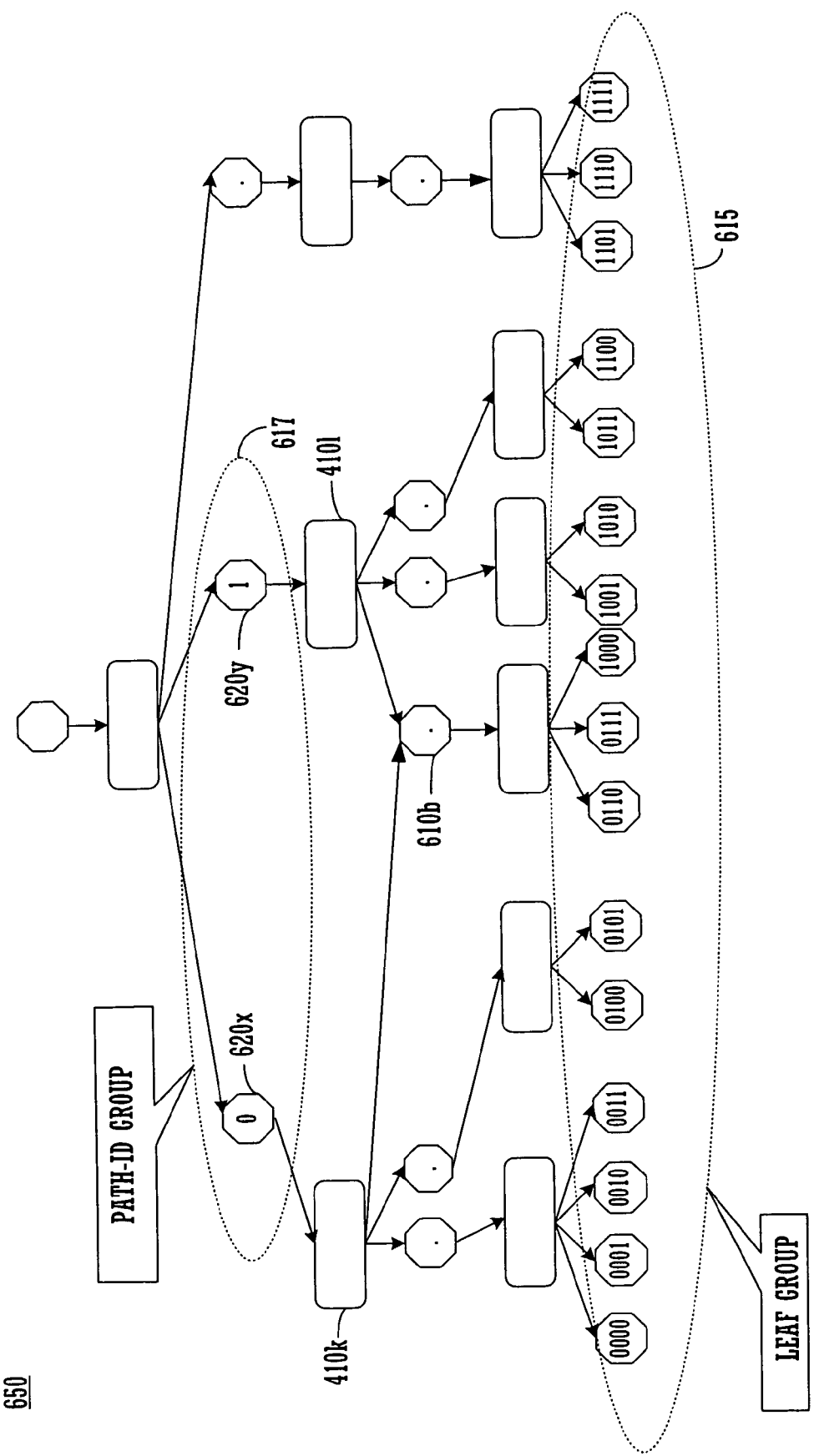
FIG. 8 illustrates an exemplary data structure showing global encoding with path conflict resolution in accordance with an embodiment of the present invention.

FIG. 8 illustrates an embodiment of the present invention in which the data structure 650 is a graph rather than a tree. This is because operation 610*b* has two parent groups (group 410*k* and 410*l*), which results because the operation 610*b* is common to both groups 410*k* and 410*l*. Whereas, for a given coding-structure that results in a tree structure, it is sufficient to encode the leaves of the tree, as each leaf defines a unique path through the tree that represents an instruction encoding. However, this is only true for a coding topology that actually is a tree structure. If the data structure is a graph, encoding only the leaves is no longer sufficient to result in an un-ambiguous instruction set.

However, noting that as the path through the data structure determines the instruction that is to be decoded, resolving this path conflict leads to an un-ambiguous solution. One way to resolve the path conflict is to add terminal Coding to all Operations above a "path-split-up," thereby resolving the ambiguity of the instruction encoding. A path-ID group 617 is depicted comprising operations 620*x* and 620*y*. In one embodiment, operations 620*x* and 620*y* are encoded with a "0" and a "1," respectively.

Thus, in FIG. 8 paths are assigned with a unique "path-ID" that allows the effective discrimination of the direction that has to be chosen when iterating the graph. The Operations that comprise the terminal Coding for path identification can be combined to Groups for which similar properties apply when Coding generation is concerned. For example, as one Operation may comprise the terminal identifier for several paths below it, the principle of encoding Multi-Occurrence-Operations below herein can be utilized here to encode the Operations comprised in a "Path-ID-Group". The width-parameter that is passed to the encoding process can here be calculated by summing all nonterminal widths up (or down) to the Operation, which is to be encoded. This is not the total payload-width associated with the Operation, as there is a subtree below it. However, this subtree is irrelevant for the encoding width parameter passed to the process, as it is the same for all Operations in the Path-ID-Groups.

When applying the computer implemented algorithm of process 1600 it can be seen that only the difference in widths is relevant to the optimal ratio between the opcodes. Thus, a constant offset in Coding width, which would be given for this situation by the identical subtree, has no impact on the resulting opcode set.

Figure 9:
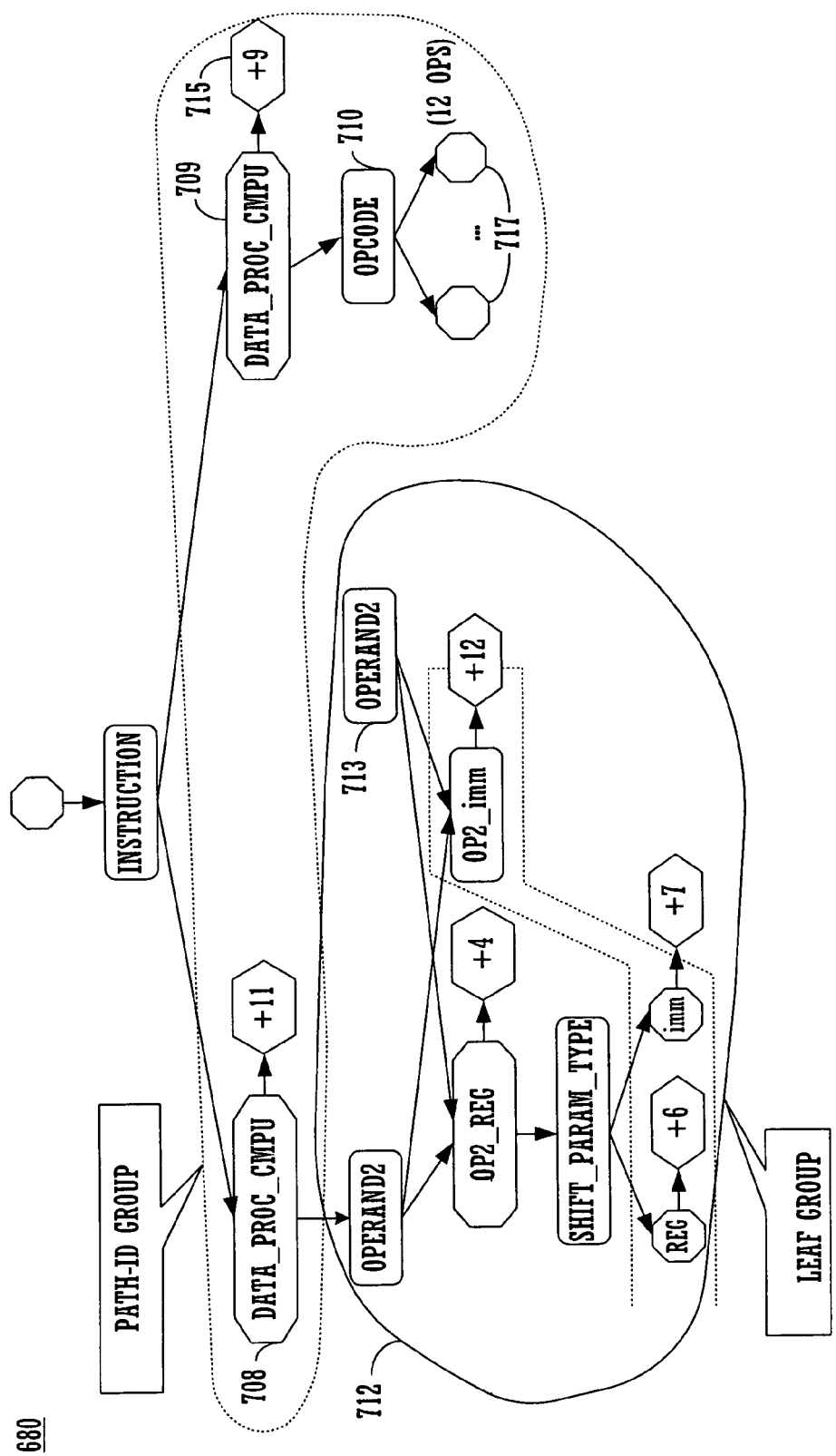
FIG. 9 illustrates an exemplary data structure for coding an ARM7 architecture in accordance with an embodiment of resolving path conflicts.

FIG. 9 illustrates an exemplary data structure 680 for coding an ARM7 architecture in accordance with an embodiment of resolving path conflicts. The Operations op2 imm, reg and imm are leaves to the total data structure 680. As they, or their parent nodes respectively, are instantiated two times, namely in Operations Data Proc CMPU 708 and Data Proc ALU 709, these Operations become the group of Path-ID Operations. The operand widths in the common subtree are not relevant to the resulting opcode and can be ignored, while the ones directly assigned to these two Ops are considered. When the Path-ID-Operations have been encoded, their resulting width is assigned to the Leaf-Operations, as they are encoded afterwards. The principle of Path-Encoding is recursively applied to subtrees and combinations of subtrees to yield the most compact result, in one embodiment.

Multi-Leaf Groups (Leaf Encoding)

The example of FIG. 9 reveals an issue that an embodiment of the present invention resolves. It is possible that an Operation will comprise more than one Group that would be suited to comprise Leaf-Operations or Operations leading to leafs. For example, in FIG. 9 the Data_Proc_ALU operation 709 comprises two groups (e.g., the Data_Proc_ALU operation 709 has children OpCode 710 and operand2 713). While there might be more than one Group in an Operation that can be used to propagate terminal Leaf-Coding, only one Group is necessary for the global graph to serve this purpose. The other Groups serve as a subtree in this case. The sub-tree may be either sub-encoded completely, or be combined with other subtrees to serve for example as an encoding for Path-IDs. This organization of the data structure 680 for encoding is illustrated in FIG. 9 in which the Operations comprised in Group "OpCode" 710 in Operation "Data Proc Alu" 709 are combined with Operation "Data Proc CMPU" 708 considering the non-terminal width of Data Proc Alu (specified by label 715 as 9 bits) for all of the 12 Ops 711.

Figure 10A:
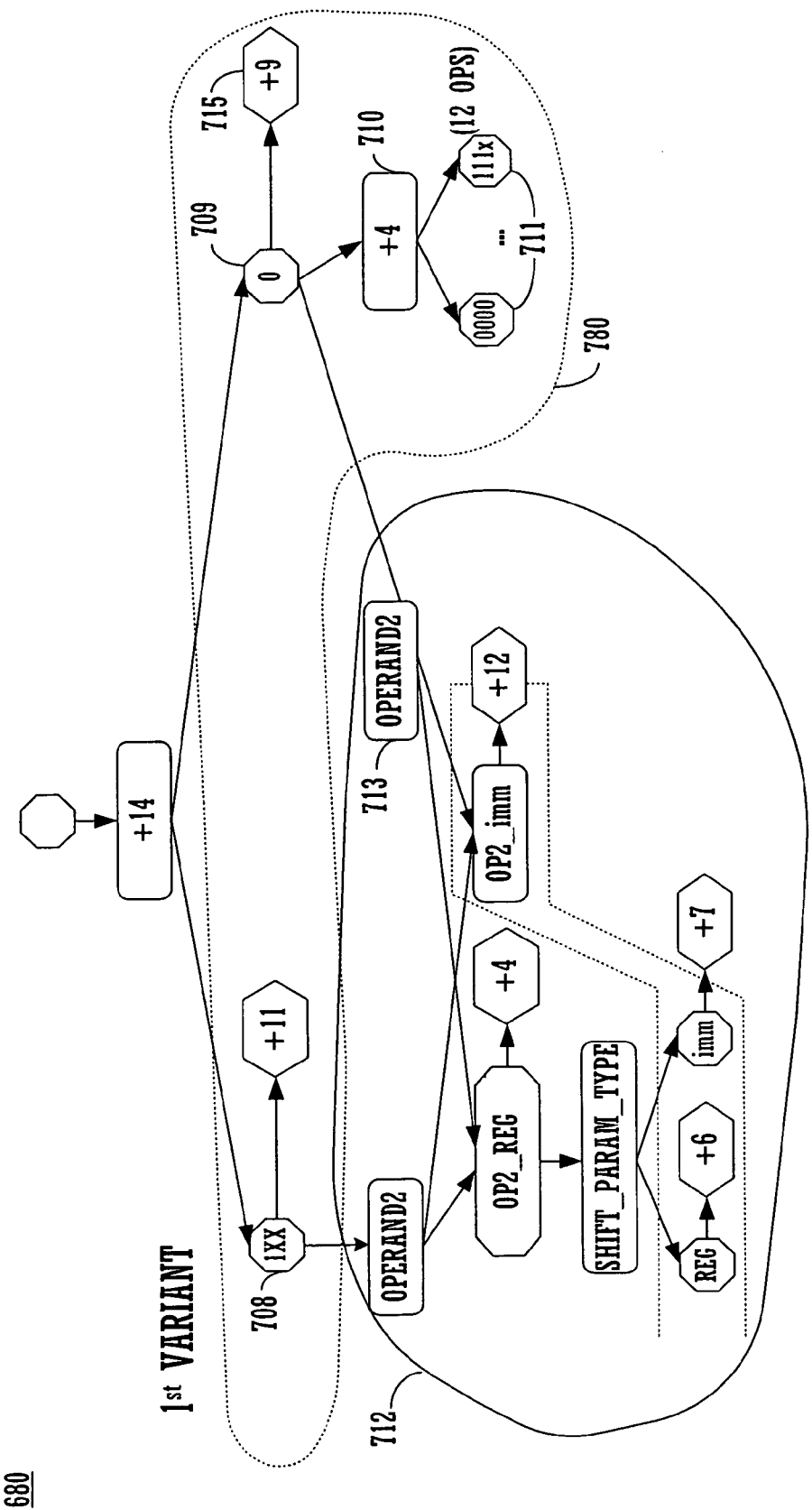
FIG. 10A and FIG. 10B illustrate two possible variations for encoding the data structure of FIG. 9, in accordance with embodiments of the present invention.
Figure 10B:
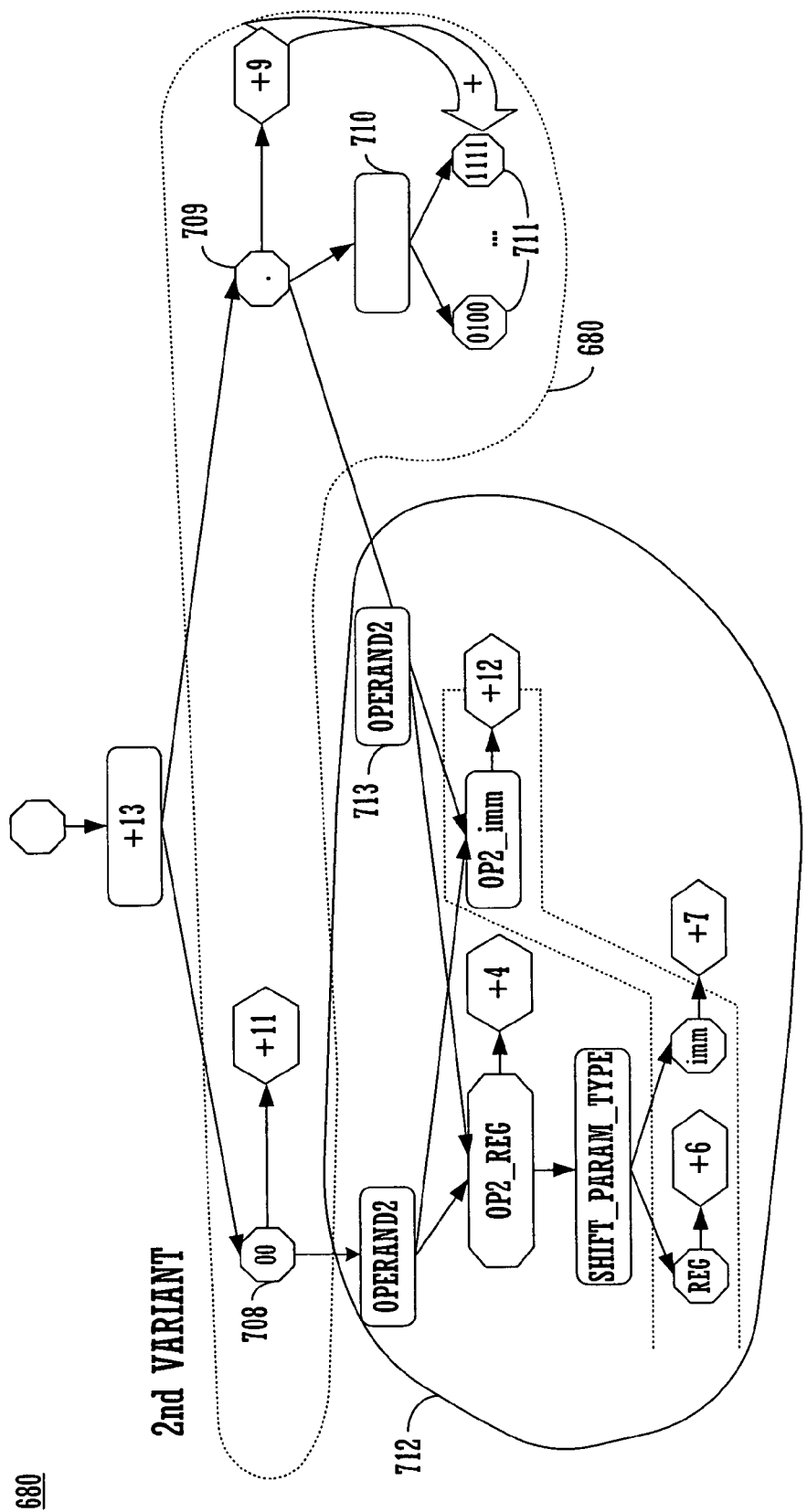

FIGS. 10A and 10B illustrate two possible variations for encoding the data structure 680 of FIG. 9. The common sub-tree 712 will serve as a leaf group. The sub-tree 780 is encoded separately from the leaf-group sub-tree 712. Note that the variant in FIG. 10A produces a bit-width of 14-bits (as depicted in root node), whereas the variant in FIG. 10B produces a bit-width of 13-bits.

In FIG. 10A, path-encoding is done for the two Operations (708, 709) directly in the path of the common subtree 712. Further, a local encoding is applied to the 12 Ops 711 that are children of OpCode 710. In the variant in FIG. 10B, the 12 Ops 711 that are children of OpCode 710 are encoded together with Data Proc CMPU 708, yielding a more efficient result. The reduced bit-width is due to reducing redundancy that can occur if Groups are encoded in accordance with a local encoding computer implemented algorithm.

The data structure 680 could have been broken into a different leaf group and sub-tree. Alternatively, the 12 Operations 711 that are children of OpCode 710 could have been included in a leaf-group sub-tree (not depicted in FIG. 10B), with the operand2 713 joined into a sub-tree with Data Proc CMPU 708 and Data Proc ALU 709. The resulting Coding however is wider in this variant. To know which Group selected for contributing to the Leaf-Group yields the most efficient Coding, all variants of the tree may be built.

Figure 11A:
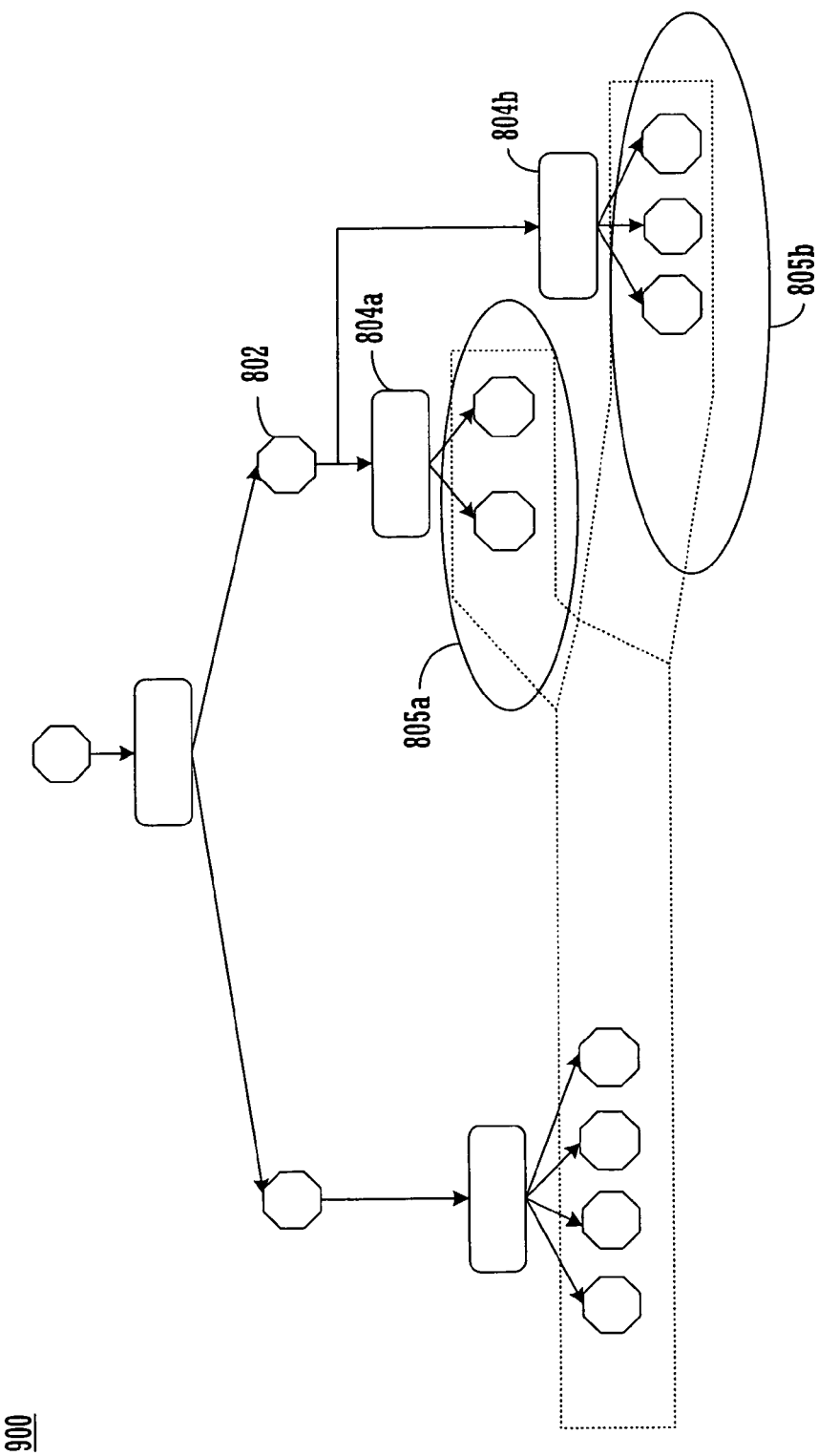
FIG. 11A illustrates alternative leaf group candidates in accordance with an embodiment of the present invention.

The principle of Leaf-Encoding is recursively applied to subtrees and combinations of subtrees to yield the most compact result, in one embodiment. FIG. 11A illustrates alternative leaf group candidates 805a and 805b in an exemplary data structure 900 in accordance with an embodiment of the present invention. If more than one Group qualifies for comprising parts of the Leaf-Group, the data structure 900 is permuted to all possible variants. Unselected Groups will be encoded as sub-trees. Afterwards, the variant yielding the most compact Coding is selected. FIG. 9B illustrates a data structure 900a with a first variant of a leaf group 910a with a sub-tree 920a formed from selected operations not included in the leaf group. FIG. 9C illustrates a data structure 900b with a second variant of a leaf group 910b with a sub-tree 920b formed from selected operations not included in the leaf group.

Global Computer Implemented Algorithm

In one embodiment of the present invention global encoding is performed. FIG. 12 is a flowchart illustrating steps of a process 1200 of automatically generating an instruction set from a hierarchical description using global encoding, in accordance with an embodiment of the present invention. It will be understood that not all steps in process 1200 are required and that other steps may be added. In step 1210, a data structure for an architecture description is accessed. The data structure has a hierarchical structure and may be a tree or a directed graph.

In step 1220, a leaf-group is identified. Exemplary leaf groups (615, 712, 910a, 910b) are depicted in FIGS. 7A, 9, 11B, and 11C, respectively. It is possible to completely encode the data structure with encoding the leaf-group. However, for many typical architectures for which instruction sets are desired some additional nodes of the data structure will be encoded in order to derive an un-ambiguous instruction set.

In step 1230, ambiguities, if any in the hierarchical structure, due to path-splits are resolved. By an ambiguity in the path, it is meant that a leaf node can be reached by multiple different paths from the root node. As discussed herein a path-ID group can be formed and encoded. Thus, a bit-width for the path-ID group is determined, along with encodings for operations in this group. Step 1230 may comprise identifying operations above path split-ups and encoding these operations. For example, in FIG. 8, operations 620x and 620y are identified and assigned codes, such that the path split ambiguity is resolved. Thus, when going through operation 610b, there is no ambiguity because operations 620x and 620y have unique encodings. However, this is not the only technique for resolving the ambiguity due to the path spilt.

In step 1240, multi-occurrence operations in the hierarchical structure are resolved. For example, FIGS. 8-9 and associated description provide one technique for resolving multi-occurrence operations. However, step 1240 is not so limited.

In step 1245, operations comprising more than one group are resolved. Step 1245 may comprise permuting the hierarchical description into a plurality of variations each comprising a group comprising leaf operations to be encoding together and a sub-graph to be encoded separate from the group comprising leaf operations. For example, FIGS. 10A-11C and associated description provide one technique for resolving multi-occurrence operations. However, step 1245 is not so limited.

In step 1250, payload and encoding widths are propagated to the leaf group that was identified in step 1220. For example, FIG. 7B depicts such a propagation. Step 1250 includes propagating label-widths (e.g., payload widths), as depicted in FIG. 7B. Step 1250 also includes propagating the encoded widths from the Path-ID-Groups and subtrees, which were encoded in steps 1230 and 1240, respectively.

In step 1260, the Leaf-Group is encoded. This encoding may be accomplished by applying an encoding computer implemented algorithm once to all operations in the leaf group. The encoding may be based on propagated label widths and encoded widths of Path-ID-Groups and subtrees. The instruction set is then derivable by traversing each path from leaf to root, concatenating whatever encodings exist. Note that in process 1200 not all nodes of the data structure need to be encoded.

Pre-Encoding

Figure 13A:
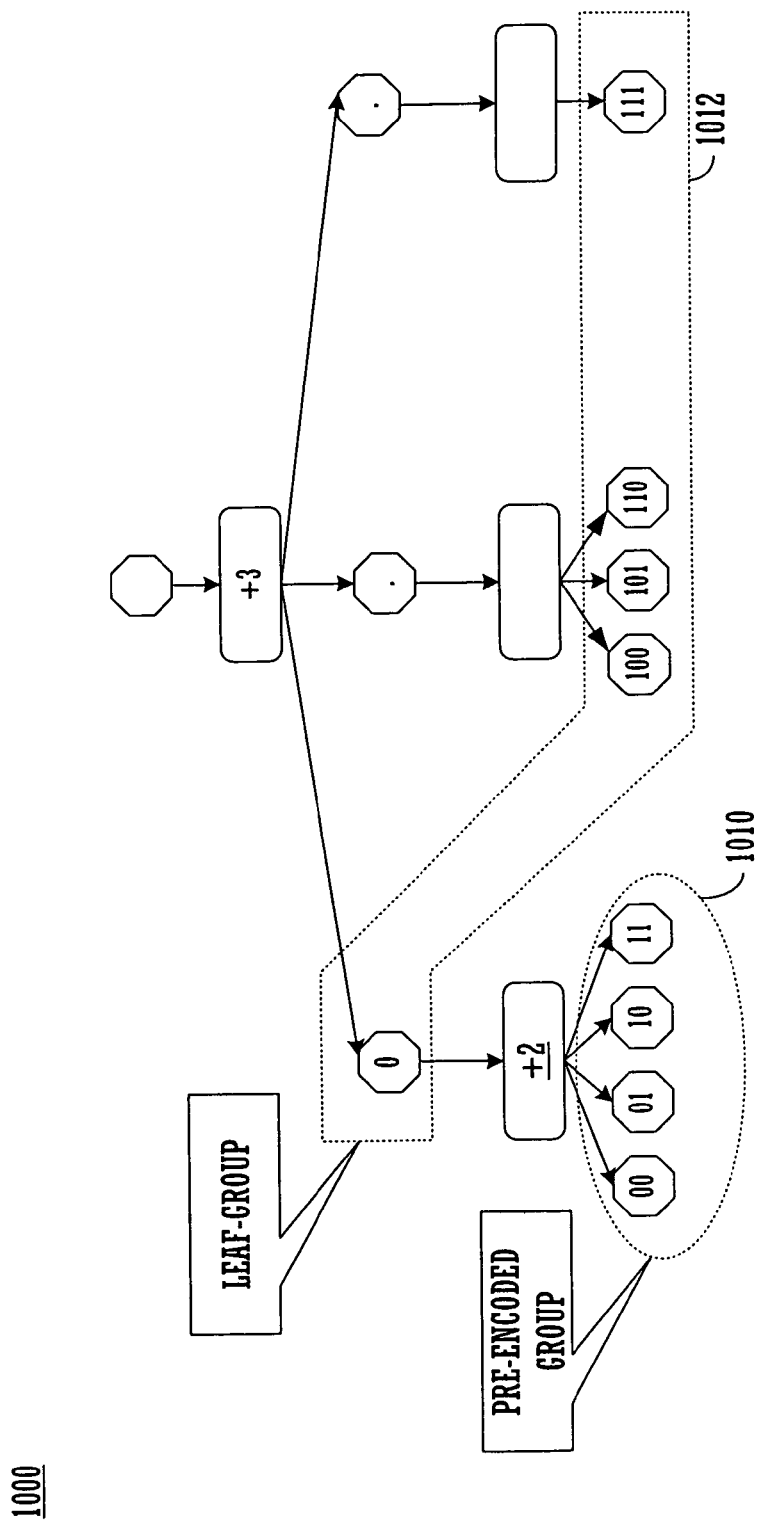
FIG. 13A illustrates an exemplary data structure showing global encoding with pre-encoding in accordance with an embodiment of the present invention.
Figure 13B:
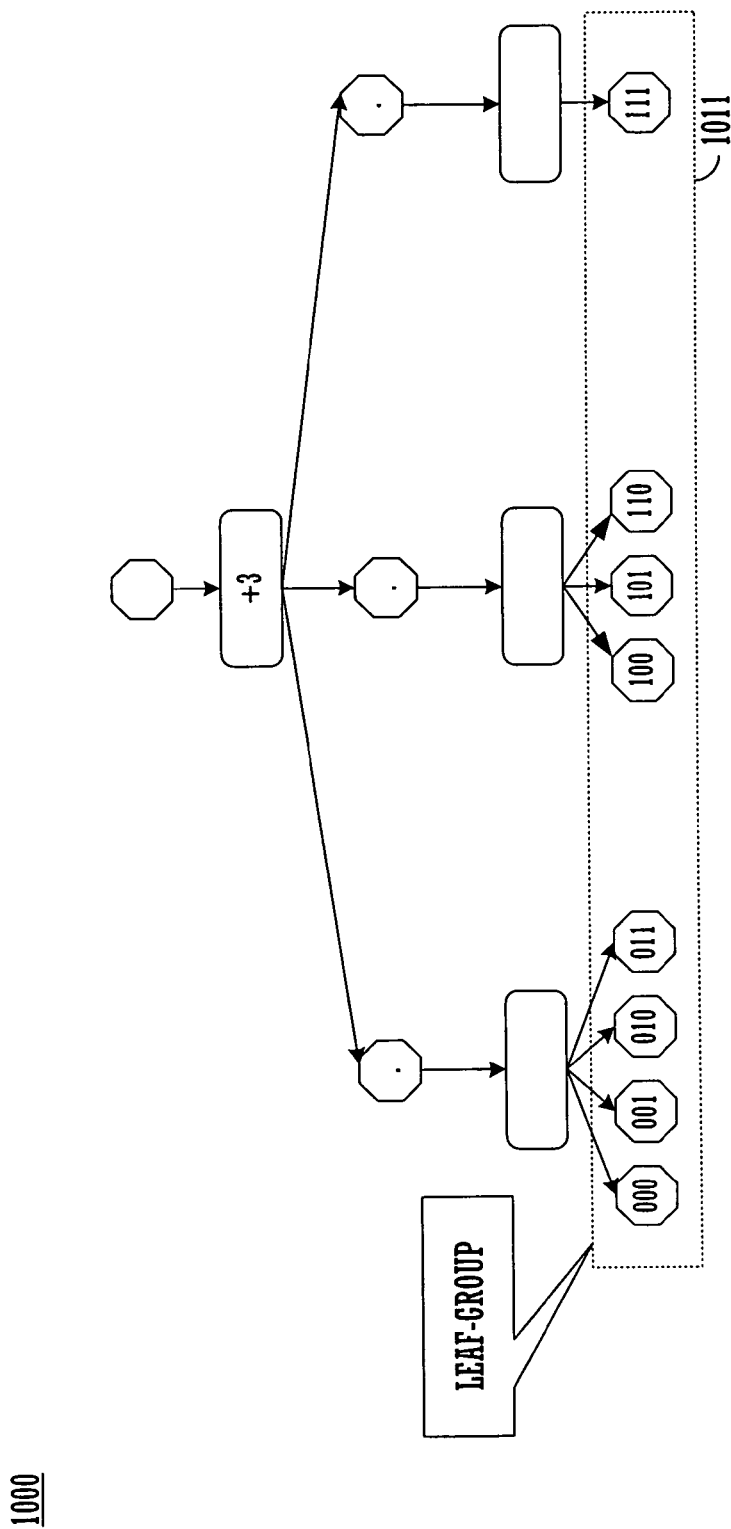
FIG. 13B illustrates the exemplary data structure of FIG. 13A showing global encoding without pre-encoding in accordance with an embodiment of the present invention.

The number of possible permutations of a given data structure can become very large. An embodiment of the present invention pre-encodes certain groups to reduce the number of permutations. In one aspect, pre-encoding is performed on all Groups that are packed perfectly (e.g., encoding does not produce any don't-care-bits). FIG. 13A illustrates an exemplary data structure 1000 showing global encoding with pre-encoding of a group 1010 prior to encoding the leaf-group 1012 in accordance with an embodiment of the present invention. FIG. 13B illustrates the exemplary data structure 1000 of FIG. 13A showing global encoding of the leaf-group 1011 without pre-encoding in accordance with an embodiment of the present invention.

FIG. 13A demonstrates why pre-encoding of these Groups (e.g., group 1010) is not of any disadvantage. The width of the pre-encoded Group 1010 in FIG. 13A is added to the operand-width-parameter, thereby the same Coding is achieved like in the case in FIG. 13B as the pre-encoded width is "weighted" when encoding the parent node instead of the optimally packed children.

Therefore, before determining the Leaf-Group, a pre-encoding is done. The pre-encoding may be performed in accordance with the local encoding computer implemented algorithm; however, this is not required. Groups are encoded and their width is propagated up to the next level, which is encoded again and so on. However, in this case the recursion breaks as soon as a certain Group's don't-care-bits would have to be generated. The Operations in that Group are candidates for the Leaf-Group then—all "perfect" Groups below them have their local encoding. This measure reduces the computational overhead dramatically as "perfect packing" is a common aspect of typical architectures. For example, this may be the case for bit-fields conveying register addressing or flag-fields. As an illustration, these are usually modeled via Groups in the LISA language that can be encoded optimally and add no overhead to the search for the most efficient solution for the instruction set.

Hybrid Encoding

Figure 14:
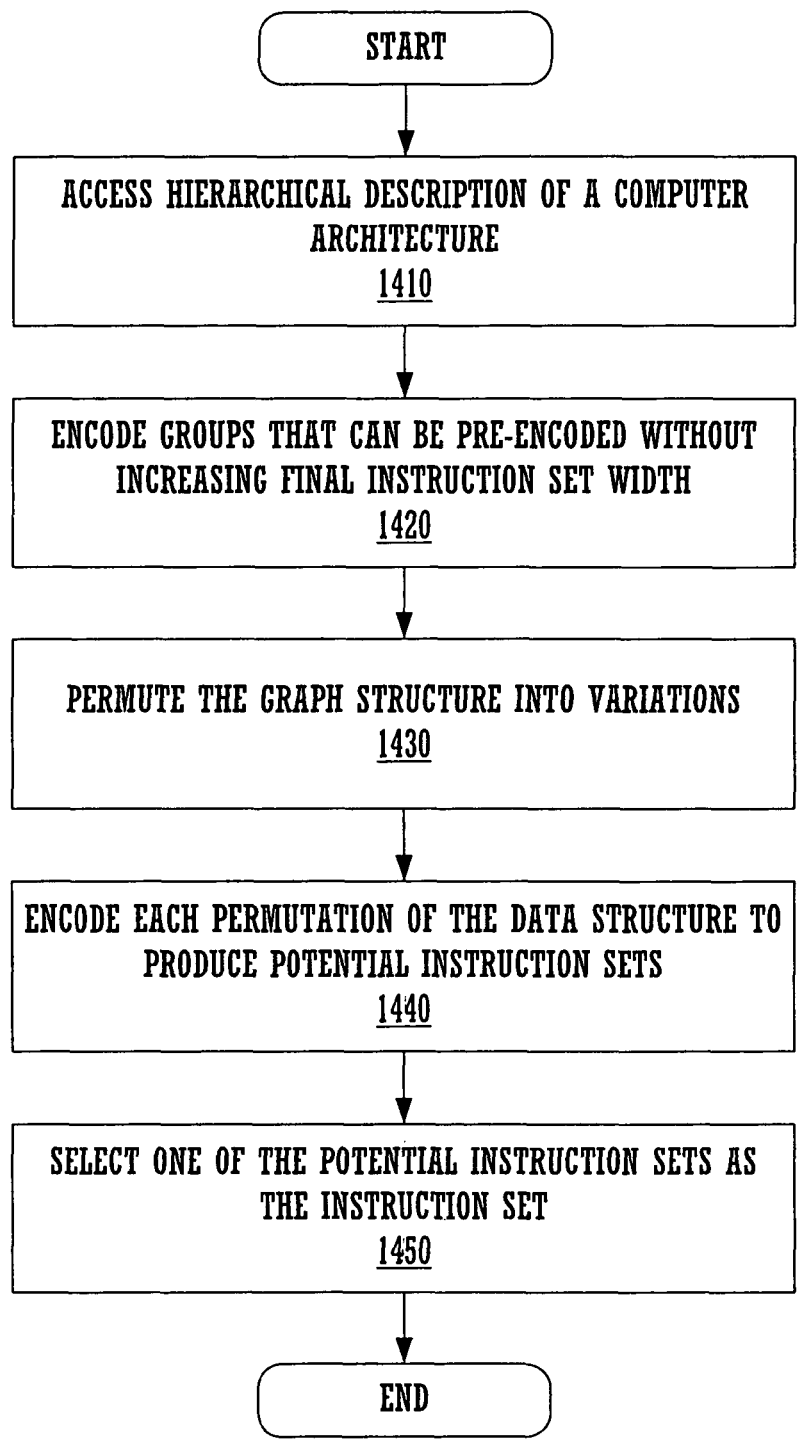
FIG. 14 is a flowchart illustrating steps of a process of automatically generating an instruction set from a hierarchical description using hybrid encoding, in accordance with an embodiment of the present invention.

In accordance with an embodiment of the present invention that used hybrid encoding, principles of local and global encoding are employed. In general, global encoding is applied to a group of leaf nodes and local encoding is applied to selected sub-groups. FIG. 14 is a flowchart illustrating steps of a process 1400 of automatically generating an instruction set from a hierarchical description using hybrid encoding, in accordance with an embodiment of the present invention. In step 1410, a data structure for an architecture description is accessed.

In step 1420, groups that can be encoded without leading increasing final width of said instruction set. Step 1420 may comprise encoded groups that can be perfectly packed. In other words, the number of operations in the group is a power of two. This encoding can be done with a local encoding embodiment discussed herein. For example, process 400 of FIG. 4 can be applied to the groups that can be perfectly packed. Thus, a sub-graph is encoded. However, step 1420 is not limited to process 400.

Figure 11B:
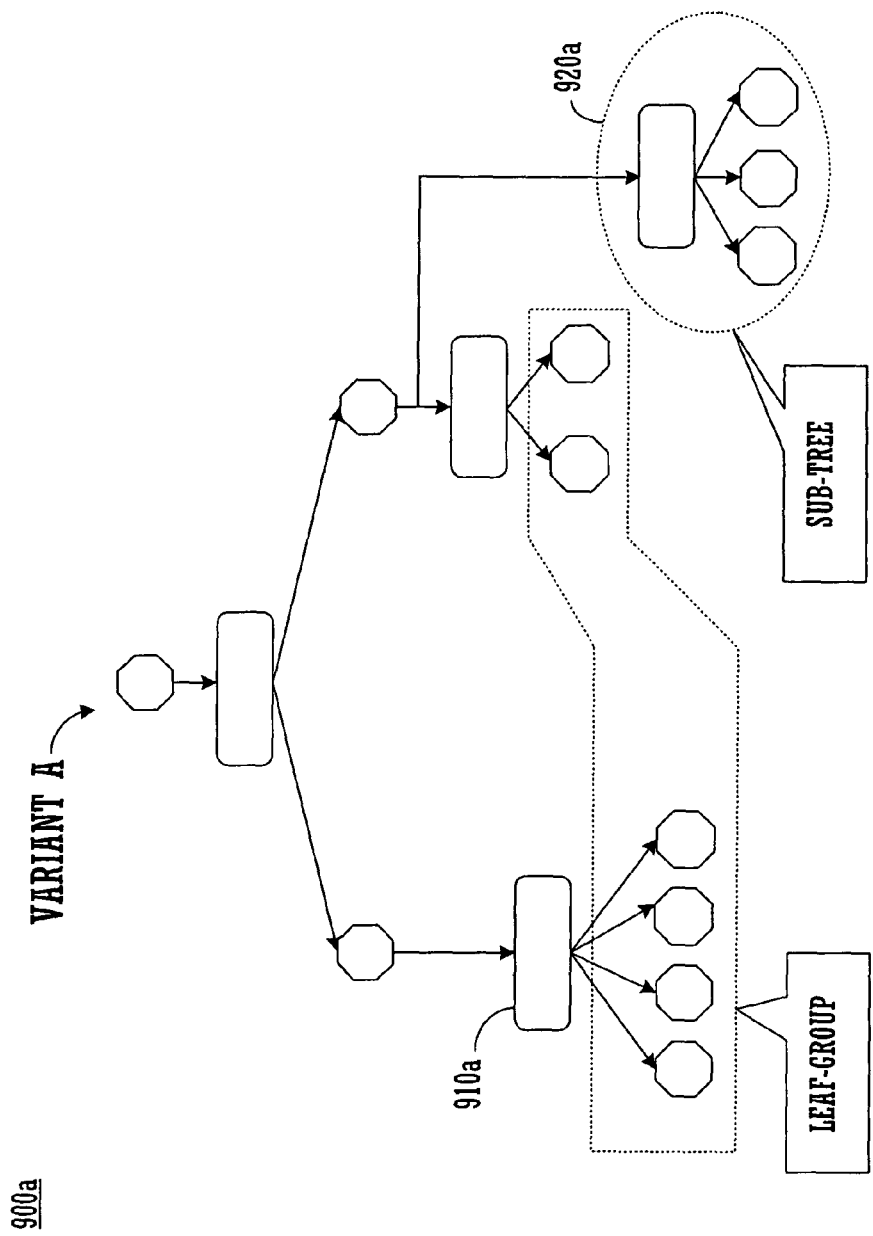
FIG. 11B and FIG. 11C illustrate embodiments selecting alternative leaf group candidates of FIG. 11A in accordance an embodiment of the present invention.
Figure 11C:
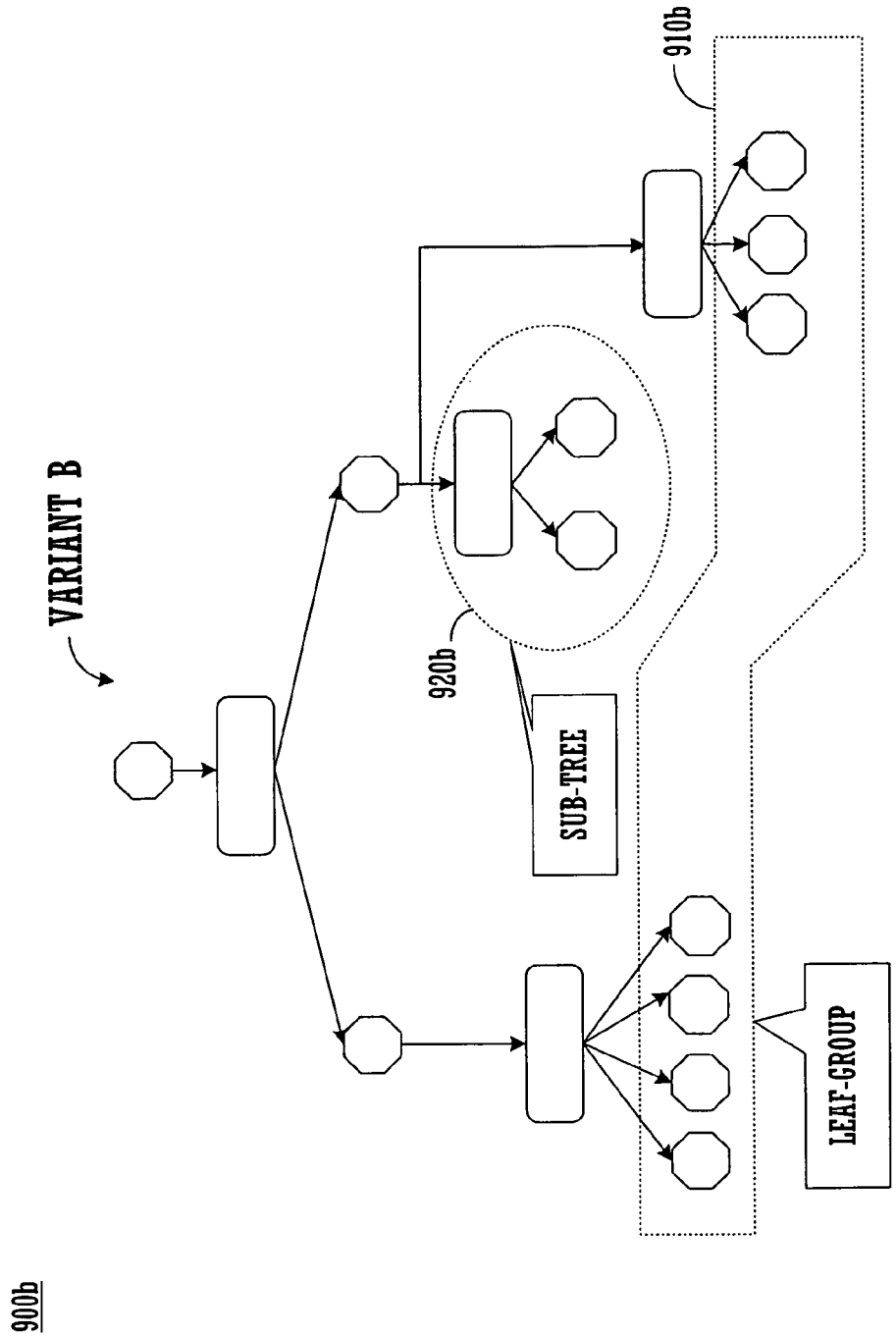

Groups that cannot be perfectly packed are candidates for a global leaf group. For example, assume that the data structure in FIG. 11A is being encoded. Potentially, two variants would be formed as illustrated in FIGS. 11B and 11C. However, it is not required that both variants actually be constructed. If, for example, group 805a can be perfectly packed, then group 805a is pre-encoded. The same applies to group 805b.

In step 1430, the data structure is permuted into variants of Group-selections in Operations comprising more than one Group that (itself or sub-Groups) contains Leaf-Group candidates. For example, FIG. 11A illustrates an operation 802 that has two groups 804a and 804b, wherein groups 804a and 804b contain leaf group candidates. Each variant has a leaf-group and one or more sub-graphs to be encoded. FIGS. 11B and 11C illustrate two potential permutations, each with a leaf-group and a sub-graph. In practice, a data structure may have many more permutations. However, the pre-encoding of step 1320 can reduce the number of permutations without compromising the efficiency (e.g., bit-width) of the instruction set.

Further, in the example of FIG. 11A the groups 904a and 804a themselves comprise leaf-group candidates (805a and 805b). However, step 830 also applies to the case in which sub-groups descending from the multiple groups in the same operation are leaf-group candidates.

In step 1440, each permutation of the data structure is encoded. This includes encoding the leaf-group and the one or more sub-graphs to produce a potential instruction for each permutation. For example, the process 1200 of FIG. 12 or the process 1500 of FIG. 15 is applied to each permutation. As an example, in FIG. 9B, sub-tree 920a would be encoded, as well as leaf group 910a. In this case, the sub-graph being referred to is sub-tree 920a.

In step 1450, one of the potential instruction sets of the permutations is selected, wherein an instruction set is determined. The selected permutation may be one with the smallest bit-width.

ALTERNATIVE EMBODIMENT

FIG. 15 is a flowchart illustrating steps of a process 1500 of automatically generating an instruction set from a hierarchical description, in accordance with an embodiment of the present invention. Process 1500 is similar to process 1200. However, there are some significant distinctions. In step 1510, a data structure for an architecture description is accessed.

In step 1515, a leaf-group is identified. Exemplary leaf groups (615, 712, 910a, 910b) are depicted in FIGS. 7A, 9, 11B, and 11C, respectively. It is possible to completely encode the data structure with encoding the leaf-group. However, for many typical architectures for which instruction sets are desired some additional nodes of the data structure will be encoded in order to derive an un-ambiguous instruction set.

In step 1520, operations above path split-ups are identified. For example, in FIG. 8, operations 620x and 620y are identified.

In step 1530, the operations identified in step 1520 are combined into a path-ID group. Step 1530 may also comprise combining subtrees with the Path-ID-Group. For example, in FIGS. 10A and 10B, a sub-tree is combined with a path-ID group. If more than one subtree is selectable, then all combinations may be tested with one solution selected.

In step 1540, Path-ID-Groups are encoded. Referring to FIGS. 10A and 10B, two variants are encoded. The solution that produces the smallest encoded width may be selected. Thus, FIG. 10B would be selected. Step 1540 may be applied recursively.

In step 1550, subtrees are encoded that have not been encoded already. For example, assume that the data structure 900 in FIG. 11A is being encoded. Further assume that the variant in FIG. 11B is being encoded by process 1500. It is possible that sub-tree 910a was pre-encoded, and thus would not need to be encoded in step 1550. Recall that the pre-encoding is performed to reduce the number of permutations. However, if sub-tree 910a was not pre-encoded, then it would be encoded in step 1550. The encoding may be performed by a local encoding computer implemented algorithm, similar to a local encoding embodiment discussed herein. However, this is not a requirement.

In step 1560, the encoding widths of the encoded Path-ID-Groups and subtrees are propagated to the Leaf-Operation group defined in step 1505. Labels identifying payloads are also propagated in step 1560.

In step 1570, the Leaf-Group is encoded. This encoding may be accomplished by applying an encoding computer implemented algorithm once to all operations in the leaf group. The encoding may be based on propagated label widths and encoded widths of Path-ID-Groups and subtrees passed in step 1560,

Opcode and Bit-Width Generation

FIG. 16 illustrates steps of a process 1600 of opcode generation and bit-width calculation, in accordance with an embodiment of the present invention. This opcode generation and bit-width calculation embodiment may be used along with other embodiments of the present invention described herein, such as embodiments that provide for local, global, or hybrid encoding. For example, the present embodiment may be applied separately to each group in a local encoding embodiment. The present embodiment may be applied once globally to selected groups in a global encoding embodiment. The present embodiment may be applied to selected groups individually and once globally to selected groups in a hybrid encoding embodiment. However, it is not required that this opcode generation and bit-width calculation embodiment be used in any of the other embodiments of this invention.

An underlying principle of the present embodiment is to use an array as input that describes how often a certain operand payload-width is used in the instruction set. This array is sorted starting from the shortest operand width up to the longest. The computer implemented algorithm in this embodiment iterates this array two times starting with the shortest entry in this array, calculating the number of opcodes each entry requires from its next longer neighbors in the first pass. These opcodes are used as prefixes that allow distinguishing a certain set of operand widths from another one. The second pass starts with the longest array-entry, generating an initial opcode set.

Following stages permute these opcodes to the number of opcodes each particular width entry needs. The additional width added to these opcodes by the permutation should not exceed the binary width difference to this longer neighbor.

This is inherently ensured by the first reverse iteration over the array, that calculates the number of prefix-vectors the shorter entry requires from the longer entry in order not to exceed the width difference to this longer neighbor. This number is then added to the total number of opcodes needed by the longer neighbor entry. The same calculation is then executed for this entry and so on.

FIG. 16 provides an illustration for a short input array 1302. The input array 1302 depicts that four instruction have an operand width of zero bits, 15 instructions have an operand width of seven bits etc. In step 1305, the number of start-opcodes needed from the left (longer) neighbor is calculated based on the binary width-difference that could be used to permute these prefixes to encode all instructions of this stage. For example, the value "p" is calculated as given in the formula in box 1310. As this width-difference is not to be exceeded, there may be several start-opcodes requested from the left neighbor. The calculation proceeds from array entry "0" to array entry "4," as depicted in box 1308.

In the present example, the seven bits difference between the four instructions of operand width zero and the 15 instructions of operand width seven could be used. As this is more than enough to encode the four operations of the first stage, only a single prefix-opcode is requested from the longer stage (at least one prefix is necessary to discriminate the opcodes of this stage from the ones of the previous stages).

Next, the iteration continues instruction associated with array entry "1." For example, the instructions that convey an operand width of seven bits. Here, not only the 15 opcodes needed for this specific stage would have to be generated, but the prefix that is to be returned to the previous stage as well. Hence, this has to be added to the overall number of opcodes. The same calculation is made like for array entry "0". For example, the number of prefixes required from the left neighbor of this stage is determined. As the width-difference to that stage is 11−7=4 bits, one prefix will again be sufficient to permute it to the 16 opcodes necessary. This principle is repeated until the last (or longest) entry in the array 1302 has been reached.

Then, the overall width of the instruction set (or portion being calculated) is determined as given by the formula in box 1315. Note, that for example, this width calculation may be for a local group and not an entire instruction set. The sum of opcodes needed for this stage and the number of start-opcodes to be propagated to the second longest stage (12 bits wide). For this number of instructions a "standard" opcode set is generated, in this case 4 opcodes are needed for the instructions with 13 bit wide operands, plus the 4 prefixes to be returned to the 12 bit wide stage result in a 3 bit wide basic opcode set. Now the overall width of the instruction set can be determined by adding these 3-bit opcode width to 13-bit operand width of the longest array entry, resulting in a 16-bit encoding. Due to the constriction not to exceed the width-difference to the longer neighbor when permuting the returned start-opcodes, none of the shorter entries will exceed this maximum width.

In step 1330, opcodes are determined. This step first determines opcodes for instructions associated with array entry "4" and then proceeds to array entry "0," as depicted in box 1335. First, an initial set of opcodes are determined, as depicted in box 1340. Four opcodes 1342 are used in the resulting opcode set 1350 for instructions associated with array entry "4." The requested prefix opcodes 1345 are returned to the right neighbor (e.g., array entry "3"). This stage then permutes the returned opcodes to the exact amount of total opcodes needed in this stage, as depicted in box 1355. For example, the array entry with the instructions having 12 bit operand width permutes the four returned prefixes 1345 to eight opcodes 1360 using the single bit width difference it had to its left neighbor.

Afterwards, it puts its opcodes 1362 needed for the number of instructions in this stage (6) into the resulting opcode pool 1350. Finally, it itself propagates the remaining two opcodes 1365 as prefixes requested by its own right neighbor (e.g., array entry "2"). This is repeated until the shortest array entry has been reached again, the opcodes for this instruction set configuration are complete then.

In this example, the calculations shown result in ideal opcodes as the intermediate results of the opcodes needed are powers of two in both cases. It is possible that the opcode generation and permutation computer implemented algorithms called in the second pass of the array results in a situation where opcodes of varying widths are generated (e.g., when n+p is not a power of two). This may be handled by padding with don't-care-bits afterwards to ensure all instructions are having the same width.

The computer implemented algorithm determines the opcode that allows building the most compact instruction set possible with the given parameter. However, the set of operand widths itself may be of a structure that will result in some bit-clipping. For example, a hypothetical instruction set that consisted only of two instructions would always get "0" and "1" assigned as opcodes, no matter of which operand width each instruction was. This is because binary encoding is atomic after all and cannot be reduced beyond one bit width. As a result, the number of bits corresponding to the difference in operand width would be set to don't-care in the instruction with the shorter operand field. These bits would be wasted. But this is due to bad instruction set design in the first place, not to the computer implemented algorithms' incapability. However, the results produced by the computer implemented algorithm allow identifying these badly designed sections in the instruction set or show space for extensions. As an example, the designer might realize that he could widen an immediate operand field without widening the overall instruction set width, as the computer implemented algorithm generates don't-care-bits in the opcode of the according instruction. This might allow addressing a larger amount of values or extending the immediate with a sign.

The computer implemented algorithm of the present embodiment has the following properties. It is of linear complexity when applied in a local encoding scheme such as the local encoding embodiment described herein. Further, the present embodiment iterates the input array two times, doing basic algebra in the first pass and opcode generation and permutation in the second. Calculation of the resulting instruction width in the first iteration over the array can be used if the opcode en coding would be packed ideally when considering the additional parameter of operand width and not only the number of opcodes needed. The present embodiment has ability to generate don't-care-bits if the operand width array given does not result in an ideally packed opcode. This gives the designer valuable feedback on the space efficiency of his instruction set, allowing him to spot room for optimization.

General Computer Implemented Algorithm

Figure 17:
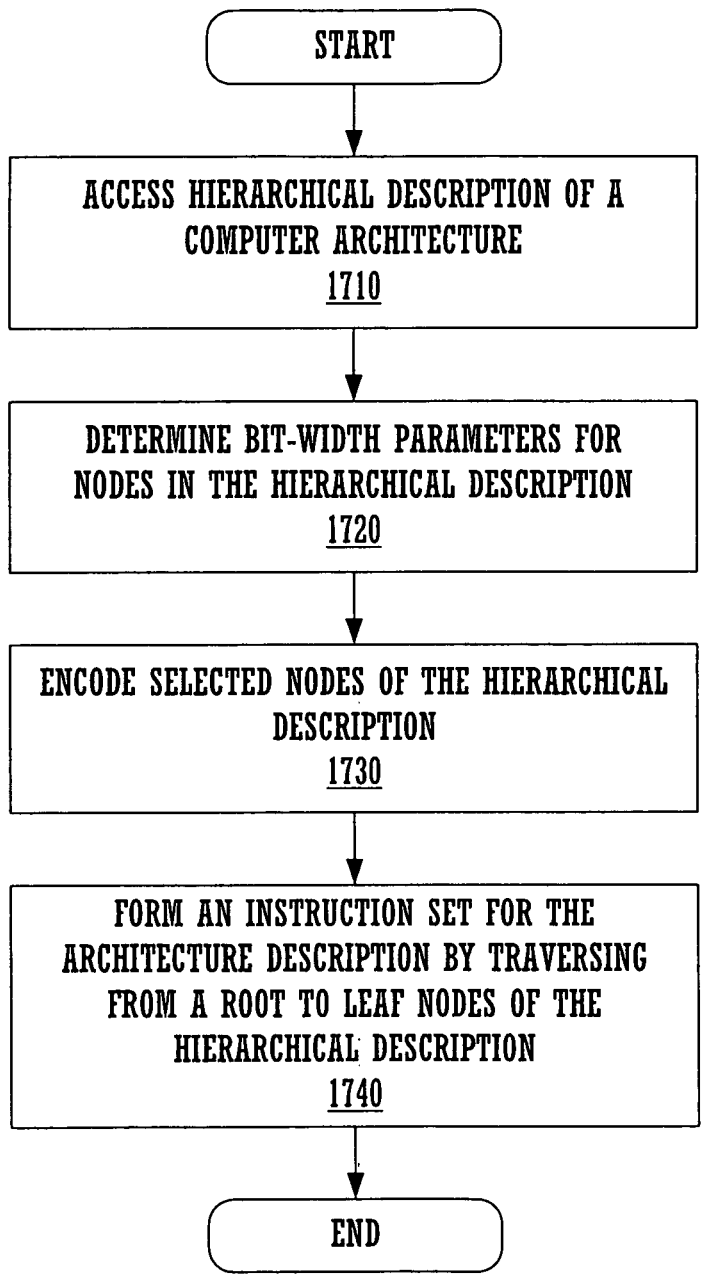
FIG. 17 depicts a general computer implemented algorithm for automatically generating an instruction set, in accordance with an embodiment of the present invention

FIG. 17 depicts a general process 1700 for automatically generating an instruction set, in accordance with an embodiment of the present invention. In step 1710, a hierarchical description of an architecture description is accessed.

In step 1720, bit width parameters for nodes of the hierarchical description are identified. Bit-width parameters may include payload information associated with an operation. Bit-width parameters may also include encoding width information derived from encoding operations for a portion of the hierarchical description.

In step 1730, selected nodes of the hierarchical description are encoded based on the bit width parameters. Step 1720 may comprise applying a local encoding computer implemented algorithm to some or all groups in the hierarchical description. Step 1720 may comprise applying a global encoding computer implemented algorithm a group of leaf nodes in the hierarchical description. Step 1720 may produce encoding widths.

In step 1740, an instruction set for the architecture description is derived by traversing from a root to leaf nodes of the hierarchical description, wherein instructions are defined by unique paths of the hierarchical description. Process 1700 is then complete.

Exemplary Computer Platform

Figure 18:
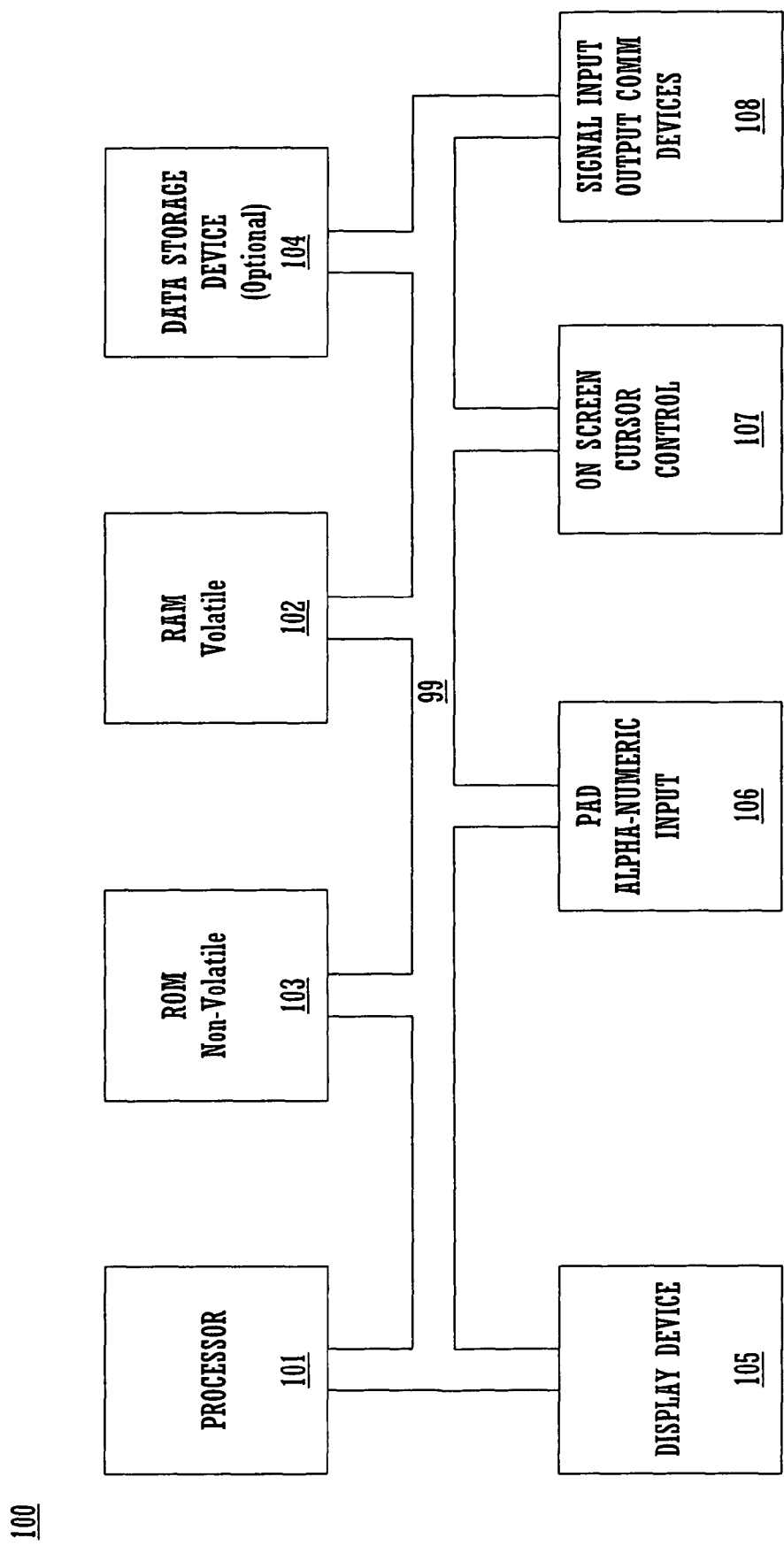
FIG. 18 is an exemplary computer system that may serve as a platform upon which embodiments of the present invention may be executed.

FIG. 18 illustrates circuitry of an exemplary computer system 100, which may form a platform for embodiments of generating an instruction set from an architecture description. Various process described herein (e.g., processes, 450, 1200, 1400, and 1600) may be implemented on computer system 100. Various data structures depicted and described herein (e.g., data structure 400, 500, 600, 650, 680, 900, and 1000) may be stored and manipulated on computer system 100. Also, exemplary code in Tables I-VIII may be stored in computer system 100. Other data structures, processes, and computer code not specifically mentioned may also be stored and executed on computer system 100.

Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., a magnetic or optical disk and disk drive) coupled with the bus 99 for storing information and instructions.

With reference still to FIG. 18, system 100 also includes an alphanumeric input device 106 including alphanumeric and function keys coupled to bus 99 for communicating information and command selections to central processor unit 101. System 100 also includes a cursor control device 107 coupled to bus 99 for communicating user input information and command selections to central processor unit 101. System 100 of the present embodiment also includes a display device 105 coupled to bus 99 for displaying information. A signal input/output communication device 108 coupled to bus 99 provides communication with external devices.

The preferred embodiment of the present invention, a process and system for generating an instruction set from an architecture description are thus described. While the present invention has been described in particular embodiments, it should be appreciated that the present invention should not be construed as limited by such embodiments, but rather construed according to the below claims.

What is claimed is:

1. A computer implemented method of generating an instruction set for an architecture, comprising:
   accessing a hierarchical description of an architecture description comprising a plurality of nodes organized into groups, each group of nodes associated with a parent node, wherein each node includes one or more operations, and comprising a plurality of paths from a root node to a plurality of leaf nodes;
   for each node, identifying an associated bit width parameter comprising the sum of a node opcode width and node payload widths;
   for each group of nodes:
      encoding each node of the group of nodes into an encoding width comprising the greatest bit width parameter associated with a node of the group of nodes; and
      passing the encoding width as a payload width to a parent node associated with the group of nodes; and
   forming an instruction set for each unique path from the root node to a leaf node in the architecture description.

2. The computer implemented method of claim 1, further comprising merging nodes in the hierarchical description that share a common operation.

3. The computer implemented method of claim 1, wherein the hierarchical description is a graph.

4. The computer implemented method of claim 3, further comprising converting the graph to a tree.

5. The computer implemented method of claim 1, further comprising determining sub-groups for each group with a number of operations equal to a power of two prior to encoding the group.

6. The computer implemented method of claim 5, wherein encoding comprises pre-encoding the sub-groups.

7. A computer implemented method of generating an instruction set for an architecture, comprising:
   accessing a hierarchical description of an architecture comprising a plurality of groups, wherein each group comprises one or more operations, and comprising a plurality of paths from a root group to a plurality of leaf groups;
   for each group:
      determining, for each operation of the group, an associated sum of node opcode width and payload widths associated with the operation;
      encoding each group into an encoding width based on the greatest sum of node opcode width and payload widths associated with an operation of each group, wherein
      the encoding width for each group is propagated to a parent group as a payload width for an operation of the parent group; and
      forming an instruction set for each unique path from the root group to a leaf group in the architecture.

8. The computer implemented method of claim 7, further comprising merging groups in the hierarchical description to form a tree structure prior to the encoding.

9. The computer-implemented method of claim 7, further comprising resolving ambiguities due to path splits prior to encoding each of the groups.

10. The computer-implemented method of claim 7, further comprising determining an encoding width for a path group comprising operations identified above a path-split.

11. The computer-implemented method of claim 7, wherein at least one operation occurs in multiple groups of the hierarchical description and further comprising merging the multiple groups into a single group.

12. The computer-implemented method of claim 7, further comprising merging multiple groups into a single group by forming a virtual operation.

13. The computer-implemented method of claim 12, wherein the virtual operation comprises operations that do not occur in more than one group of the multiple groups being merged.

14. The computer-implemented method of claim 12, wherein the virtual operation comprises an operation that occurs in more than one group of the multiple groups being merged.

15. The computer-implemented method of claim 7, wherein encoding comprises encoding a group based on an encoding width propagated to the group as a payload width from a child group.

16. A computer implemented method of generating an instruction set for an architecture, comprising:
   accessing a hierarchical description of an architecture comprising a plurality of groups, each group comprising one or more operations, and comprising a plurality of paths from a root group to a plurality of leaf groups;
   identifying a leaf group comprising leaf operations in the hierarchical description;
   determining, for each operation in the leaf group, a sum of node opcode width and payload widths associated with the operation;
   encoding the operations of the leaf group into an encoding width based on the greatest determined sum of node opcode width and payload widths;
   propagating the encoding width to a parent group of the leaf group as a payload width; and
   determining an instruction set for each unique path from the root group to a leaf group in the hierarchical description.

17. The method of claim 16, further comprising resolving ambiguities due to path splits prior to encoding the operations of the leaf group.

18. The computer-implemented method of claim 17, wherein resolving ambiguities comprises:
   identifying operations above path-splits in the hierarchical description; and
   uniquely encoding the operations above the path-splits.

19. The computer-implemented method of claim 16, further comprising:
   determining an encoding width for a path group comprising the operations identified above the path-splits.

20. The computer-implemented method of claim 16, further comprising encoding the parent group into a second encoding width based at least in part on the propagated encoding width.

21. A computer implemented method of generating an instruction set for an architecture, comprising:
   accessing a hierarchical description of an architecture comprising a plurality of groups, each group comprising one or more operations;
   pre-encoding groups in the hierarchical description that can be pre-encoded without increasing final width of the instruction set;
   permuting the hierarchical description into a plurality of variations, each variation comprising a child group and a parent group;
   for each group:
      determining, for each operation of the group, an associated sum of node opcode width and payload widths of payloads associated with the operation;
      encoding, for each variation, the child group of the variation and the parent group of the variation to produce a potential instruction set for each variation;
      encoding each group into an encoding width based on the greatest sum of node opcode width and payload widths associated with an operation of each group; wherein
      the encoding width of the parent group based at least in part on the encoding width of the child group; and
   selecting one of the potential instruction sets.

22. The computer implemented method of claim 21, wherein the encoding width of the child group and the encoding width of the parent group are based on payload information associated with operations of the child group and the parent group, respectively.

23. The computer implemented method of claim 21, further comprising, for each variation, resolving ambiguities due to path splits.

24. The computer-implemented method of claim 23, wherein resolving ambiguities comprises:
   identifying operations above the path-splits in the hierarchical description; and
   uniquely encoding the operations above the path-splits.

25. The computer-implemented method of claim 24, wherein resolving ambiguities further comprises determining an encoding width for a path group comprising the operations identified above the path-splits.

26. The computer implemented method of claim 21, wherein pre-encoding groups in the hierarchical description comprises pre-encoding groups with a number of operations equal to a power of two.

27. A computer system comprising a processor and a computer readable memory coupled to the processor via a bus, wherein the computer readable medium comprises instructions that when executed by the processor implement a method of generating an instruction set for an architecture, the method comprising:
   accessing a hierarchical description of an architecture description comprising a plurality of nodes organized into groups, each group of nodes associated with a parent node, wherein each node includes one or more operations, and comprising a plurality of paths from a root node to a plurality of leaf nodes;
   for each node, identifying an associated bit width parameter comprising the sum of a node opcode width and node payload widths,
   for each group of nodes:
      encoding each node of the group of nodes into an encoding width comprising the greatest bit width parameter associated with a node of the group of nodes; and
      passing the encoding width as a payload width to a parent node associated with the group of nodes; and
   forming an instruction set for each unique path from the root node to a leaf node in the architecture description.

28. The computer system of claim 27, wherein the group of nodes comprises leaf nodes.

29. The computer system of claim 27, further comprising merging nodes in the hierarchical description that share a common operation.

30. The computer system of claim 27, wherein the hierarchical description is a graph.

31. The computer system of claim 30, wherein the method further comprises converting the graph to a tree.

32. The computer system of claim 27, wherein the method further comprises, prior to encoding, identifying sub-groups with a number of operations equal to a power of two.

33. The computer system of claim 32, further comprising pre-encoding the identified sub-groups.

34. A computer system comprising a processor and a computer readable memory coupled to the processor via a bus, wherein the computer readable medium comprises instructions that when executed by the processor implement a method of generating an instruction set for an architecture, the method comprising:

accessing a hierarchical description of an architecture;

identifying leaf groups of the hierarchical description at a lowest level, wherein each leaf group comprises one or more operations;

for each leaf group, identifying an associated bit width parameter comprising the sum of a node opcode width and payload width parameters for the operations of the leaf group;

encoding the operations in the leaf groups based on the greatest bit width parameters into an encoding width; and propagating, for each leaf group, the encoding width of the leaf group to a parent group of the leaf group as a payload width parameter, the parent group configured to be encoded into a second encoding width based at least in part on the payload width parameter.

35. The computer system of claim 34, further comprising merging nodes in the hierarchical description to form a tree structure prior to encoding.

36. The computer system of claim 35, wherein merging comprises merging nodes with at least one common operation.

37. The computer system of claim 34, wherein the method further comprises merging nodes into a single group by forming a virtual operation.

38. A computer system comprising a processor and a computer readable memory coupled to the processor via a bus, wherein the computer readable medium comprises instructions that when executed by the processor implement a method of generating an instruction set for an architecture, the method comprising:

accessing a hierarchical description of an architecture including a plurality of groups, each group comprising one or more operations;

pre-encoding groups in the hierarchical description that can be pre-encoded without increasing final width of the instruction set;

permuting the hierarchical description into a plurality of variations, each variation comprising a child group and a parent group;

for each group:

determining, for each operation of the group, an associated sum of node opcode width and payload widths of payloads associated with the operation;

encoding, for each variation, the child group of the variation and the parent group of the variation, to produce a potential instruction set for each of the variation;

encoding each group into an encoding width based on the greatest sum of node opcode width and payload widths associated with an operation of each group; wherein the encoding width of the parent group based at least in part on the encoding width of the child group; and selecting one of the potential instruction sets.

39. The computer system of claim 38, wherein the encoding width of the child group and the encoding width of the parent group are based on payload information associated with operations of the child group and the parent group, respectively.

40. The computer system of claim 38, further comprising, for each variation, resolving ambiguities due to path splits.

41. The computer system of claim 40, wherein resolving ambiguities comprises:

identifying operations above the path-splits in the hierarchical description; and uniquely encoding the operations above the path-splits.

42. The computer system of claim 41, wherein resolving ambiguities further comprises determining an encoding width for a path group comprising the operations identified above the path-splits.

43. The computer system of claim 38, wherein pre-encoding groups in the hierarchical description comprises pre-encoding groups with a number of operations equal to a power of two.

* * * * *